United States Patent [19]

McHale et al.

[11] Patent Number: 4,935,885
[45] Date of Patent: Jun. 19, 1990

[54] METHOD AND APPARATUS FOR DETERMINING WEIGHT AND CENTER OF GRAVITY OF A VEHICLE

[75] Inventors: Charles J. McHale, Pointe Claire; Joseph Marrone, Dollard-des-Ormeaux; David Watson, Vaudreuil, all of Canada

[73] Assignee: Aldis Consultants Inc.

[21] Appl. No.: 190,107

[22] Filed: May 4, 1988

Related U.S. Application Data

[63] Continuation-in-part of Ser. No. 767,719, Aug. 20, 1985, abandoned, which is a continuation-in-part of Ser. No. 578,874, Feb. 10, 1984, Pat. No. 4,639,872.

[51] Int. Cl.$^5$ .............................................. G01M 1/12
[52] U.S. Cl. ..................................... 364/567; 364/463; 235/61 T; 73/65; 177/199
[58] Field of Search ............... 364/427, 463, 466, 567; 73/65; 235/61 T; 177/25.14, 134, 163, 199, 210 C, 211, 25.11

[56] References Cited

U.S. PATENT DOCUMENTS

| | | | |
|---|---|---|---|
| 2,735,291 | 2/1956 | Quinn | 364/463 |
| 3,446,299 | 5/1969 | Leonowicz | 364/567 |
| 3,674,097 | 7/1972 | Gile | 177/25.14 |
| 4,049,069 | 9/1977 | Tamamura et al. | 364/567 |
| 4,094,367 | 6/1978 | Jones et al. | 364/567 |
| 4,134,464 | 1/1979 | Johnson et al. | 364/567 |
| 4,492,280 | 1/1985 | Susor | 177/211 |
| 4,502,555 | 3/1985 | Gower | 364/463 |

Primary Examiner—Gary Chin
Attorney, Agent, or Firm—Charles E. Brown; Charles A. Brown

[57] ABSTRACT

An apparatus for use in determining the weight and the location of the center of gravity of a vehicle, particularly an aircraft prior to its taking off, comprising in combination at least one load-measuring device secured in a roadway or support for the vehicle and adapted for contacting load-supporting members of the vehicle when such is moved thereover or thereonto; computer means linked to the load-measuring devices and adapted to receive data therefrom; means for relaying to the operator of the vehicle data computed by the computer means, and sensor means linked to the computer means, the sensor means adapted to read characteristics of the vehicle as it observes the same and alert the computer, programmed for such characteristics. Also disclosed are methods based on use of the disclosed apparatus. Also disclosed are apparatus for and methods of processing vehicle passengers and their baggage to ensure safe operation of the vehicle. Still further disclosed are apparatus and methods for weighing and determining center of gravity of aircraft in both static and dynamic condition.

33 Claims, 11 Drawing Sheets

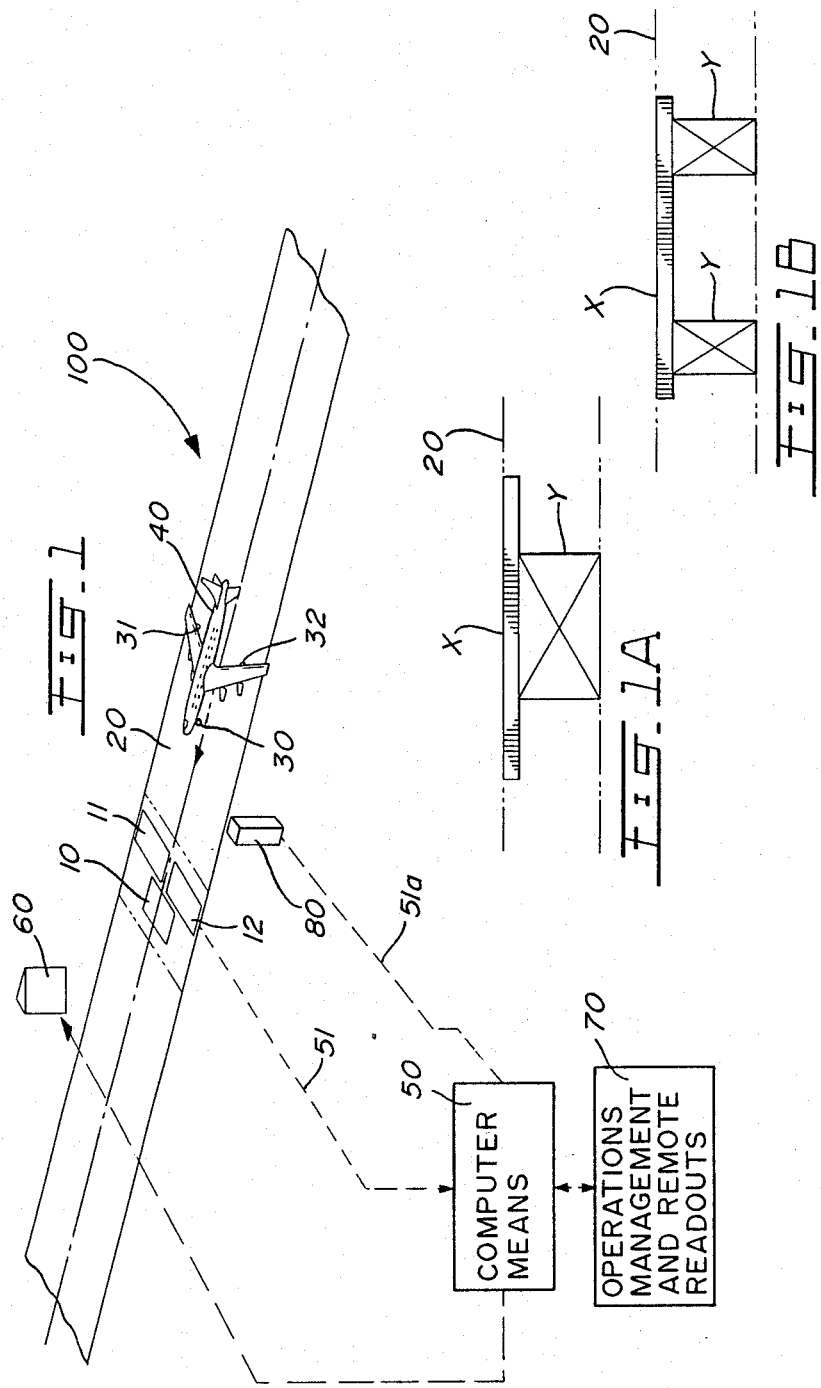

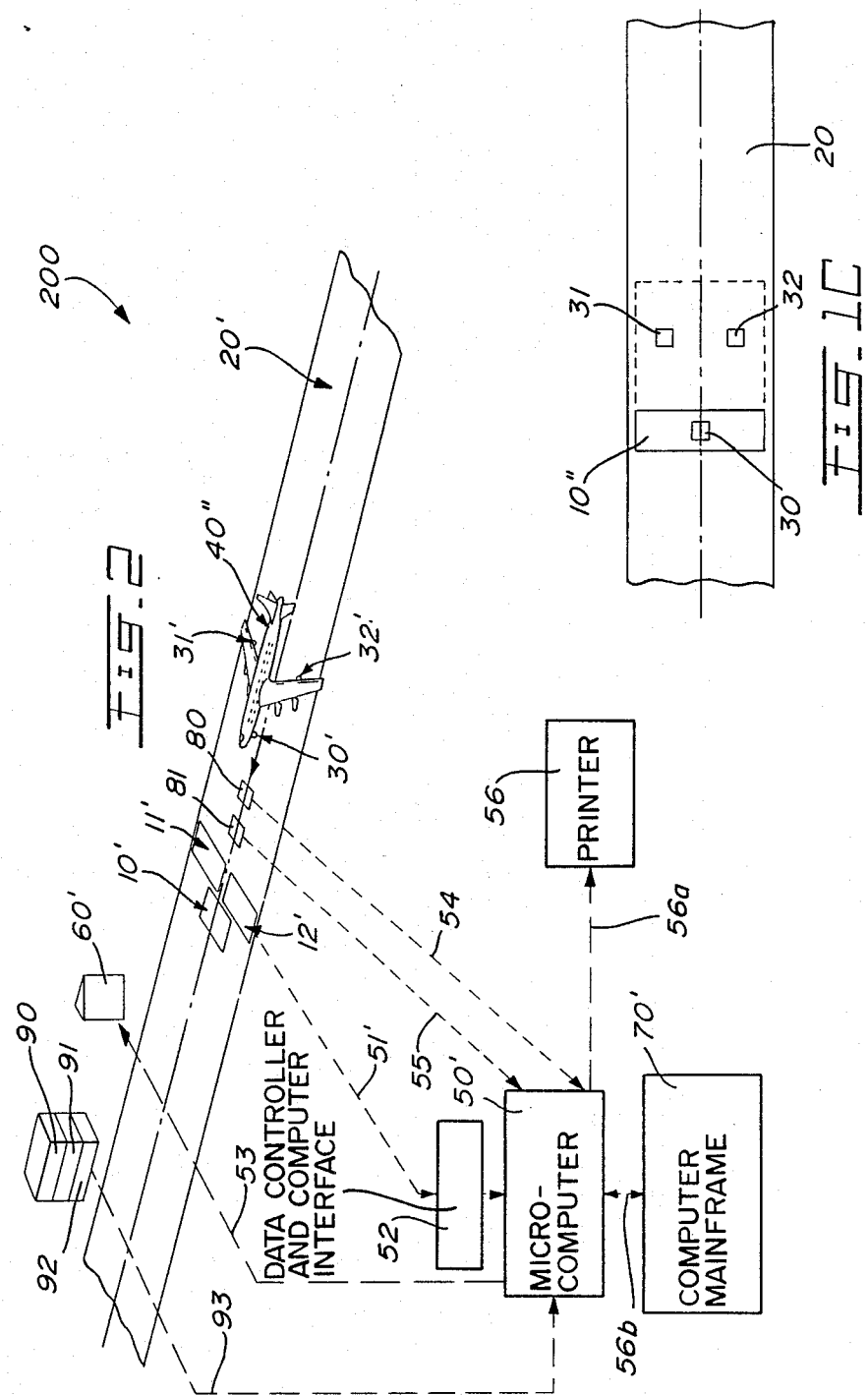

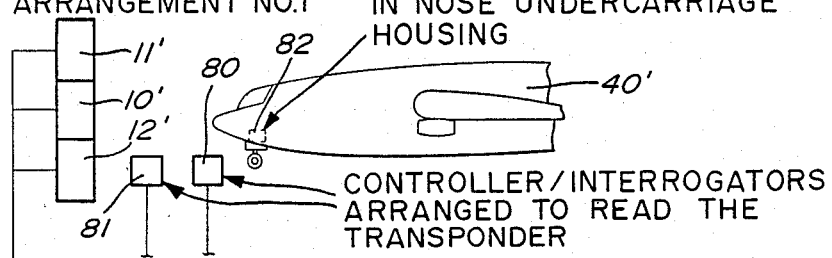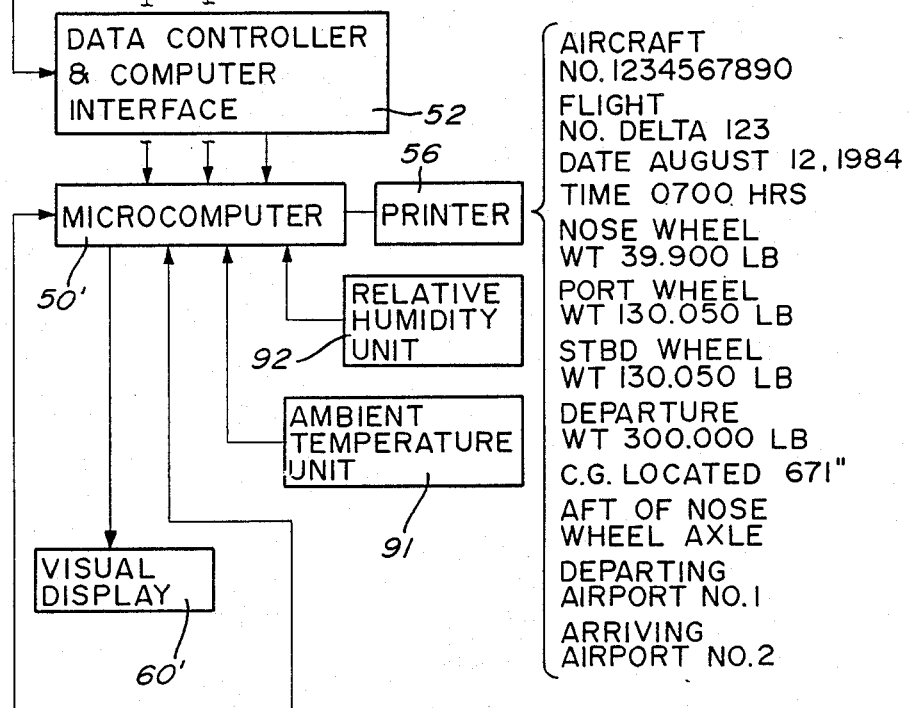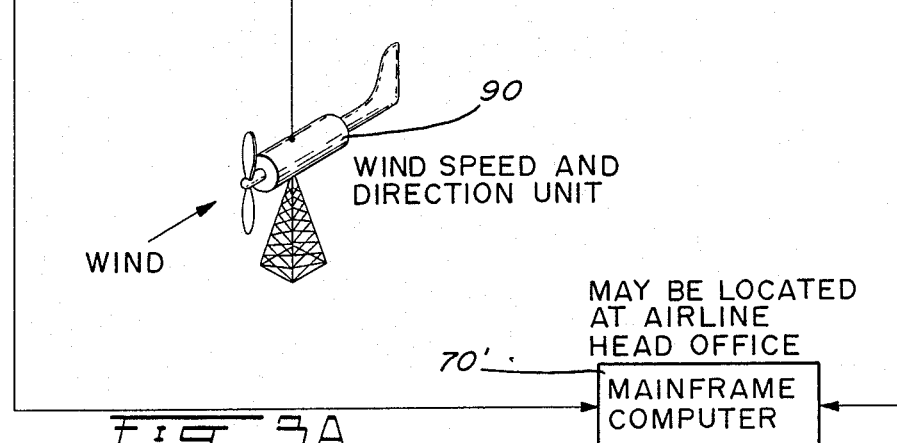
FIG. 3A

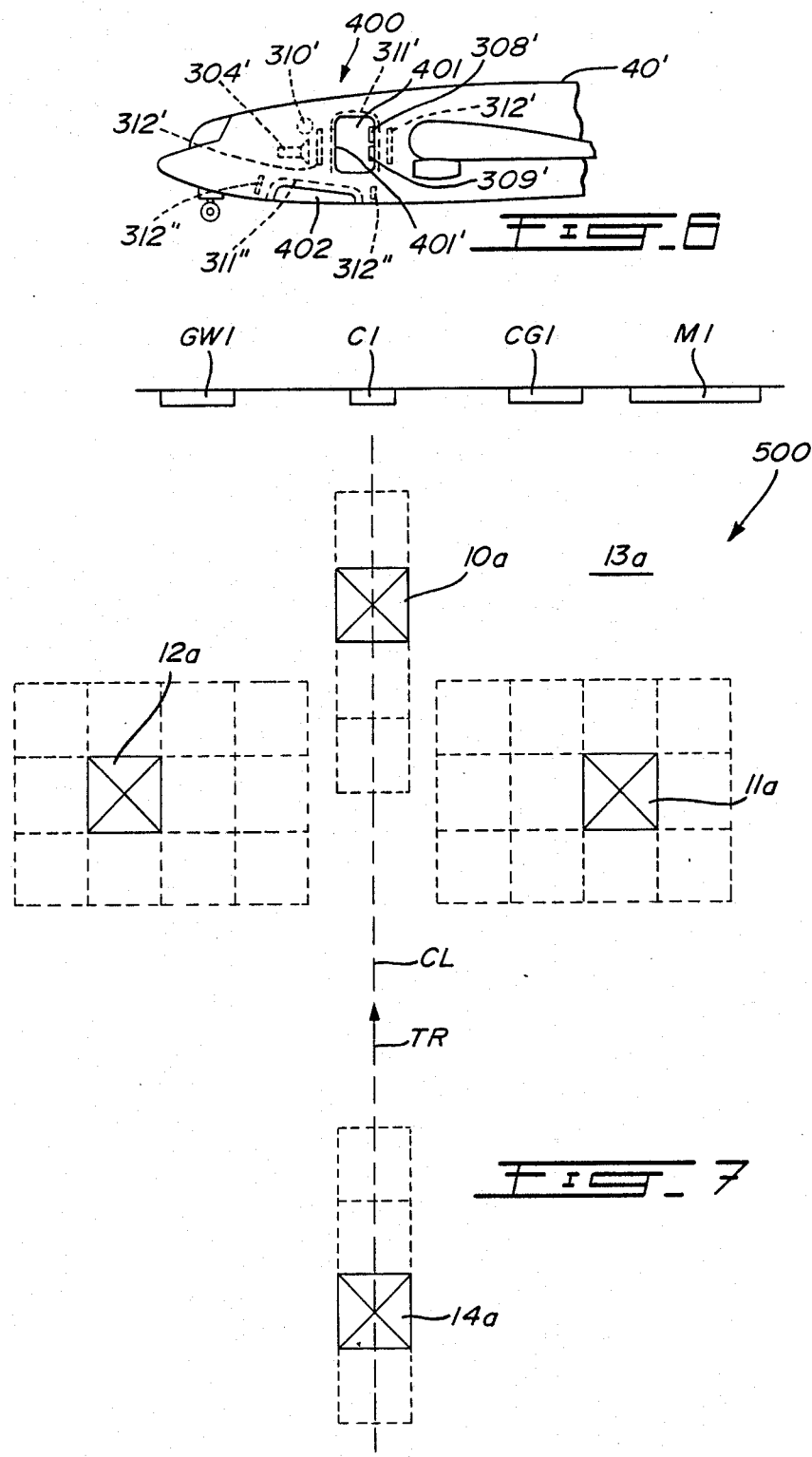

METHOD AND APPARATUS FOR DETERMINING WEIGHT AND CENTER OF GRAVITY OF A VEHICLE

CROSS REFERENCE TO RELATED APPLICATIONS

This application is a continuation-in-part application of U.S. Ser. No. 767,719 filed Aug. 20, 1985, now abandoned, which is a continuation-in-part of U.S. Ser. No. 578,874 filed Feb. 10, 1984, now U.S. Pat. No. 4,639,872.

BACKGROUND OF THE INVENTION (a) Field of the Invention

The present invention relates to methods for determining the weight and the location of the center of gravity, of a vehicle and particularly relates to methods for determining the weight and location of the center of gravity, of an aircraft prior to its taking-off, so that the pilot may safely and efficiently execute operation of the aircraft during the take-off procedure. The invention also relates to apparatus for use in carrying out said methods.

The invention further relates to measuring the weight(s) of a vehicle, particularly an aircraft, while moving or in stationary position. Also, to a vehicle, particularly an aircraft weight measuring apparatus which is programmable, whereby it serves to weigh a variety of vehicles, particularly aircraft, and is automatically programmed for weighing a particular vehicle, particularly an aircraft as its approaches the arrangement.

The invention still further relates to methods and apparatus for determining the weight of fuel on board a vehicle, particularly an aircraft, prior to its taking off. Also, to method and apparatus for processing passengers prior to their boarding an aircraft. Additionally, to method and apparatus for use in recording and conveying information, including unique identification of vehicles, particularly aircraft, vehicle passengers, baggage and cargo, etc., to an existing information bank.

(b) Description of the Prior Art

Methods and apparatus are known for use in determining the weight and the location of the center of gravity, of an aircraft. However, such methods and apparatus are not always reliable, owing to the conditions under which the apparatus must operate. One example of known apparatus used in the compilation of the weight and center of gravity, of an aircraft comprises load-measuring devices located in the undercarriage arrangements thereof. During landing operations, such devices are subjected to very heavy and sometimes shock loads which can result in their malfunction or destruction.

Problems can exist regarding safe operation of aircraft due to lack of adequate procedures and associated apparatus.

SUMMARY OF THE INVENTION

It is, therefore, an important aim of the present invention to provide improved methods and apparatus for use in determining the weight and the location of the center of gravity, of an aircraft which overcomes the aforementioned problem.

It is also an important aim of the present invention to provide a universal, accurate and reliable method of determining loadings on individual struts of an aircraft and thereby the gross weight of the aircraft.

It is well known that aircraft are not weighed as part of the despatch procedure in their day-to-day operations. It is also well known that both the gross weight and center of gravity of aircraft are derived by calculation of the various weight components disposed about the "light-weight" center of gravity, as provided by the manufacturer. It is also well known that aircraft undercarriage arrangements may comprise three or more sets of undercarriage components.

It is thus an important aim of the present invention to provide a reliable and practical means of providing weight data for all types of aircraft and related undercarriage configurations, as part of the day-to-day procedure prior to take-off, and after the landing of any aircraft, without disruption of the normal flow of traffic.

It is a further aim of the present invention to provide means whereby the calculated load data, commonly referred to as load and balance calculations, will receive a check against the calculated gross weight and also the position of the center of gravity and alert the aircraft operator to miscalculation.

It is also an important aim of the present invention to alert the aircraft operator in certain circumstances to discrepancies in the calculation, particularly in the case of fuel calculation.

It is also an important aim of the present invention, regarding an aircraft, to provide means whereby feeding calculated component weight data such as passenger and baggage weights, cargo weight and fuel weight calculations into a computing system, a reliable cross-check will be provided to alert the operator of discrepancies in these calculations, particularly with reference to fuel quantities, prior to executing take-off procedures.

It is a further aim of the present invention to provide positive means for determining the weight of available fuel in an aircraft, prior to its taking off.

It is a further aim of the present invention to provide an efficient and reliable weighing apparatus, along with associated methods, for vehicles, particularly aircraft, which can be readily adapted to weigh a variety of different vehicles and which is readily and automatically programmed for a particular one of said variety of vehicles, particularly aircraft prior to its use thereby.

It is a further aim of the present invention to provide method and apparatus for use in recording an conveying information derived from the weighing apparatus and other apparatus disclosed herein.

In one aspect of the present invention, there is provided an apparatus for use in determining the weight and the location of the center of gravity, of a vehicle, particularly an aircraft prior to its taking off comprising in combination a plurality of load-measuring devices secured to a roadway and adapted for contacting load-supporting members of the vehicle when such is moved thereover; computer means linked to the load-measuring devices and adapted to receive data therefrom; means for relaying to the operator of the vehicle data computed by the computer means, and sensor means linked to the computer means, the sensor means adapted to read characteristics of the vehicle as it observes the same and alert the computer, programmed for such characteristics.

In a further aspect of the present invention, there is provided a method for determining the magnitude of load carried by the individual load-supporting undercarriage members an aircraft, when the members are in contact with the ground, including for example, prior to the aircraft taking off, comprising the steps of moving the aircraft along a pathway therefor and over load-measuring means positioned in the pathway in such manner said load-measuring means is contacted by the individual load-supporting undercarriage members, whereby to record the load data; and utilizing the recorded load data for subsequent operation of the aircraft.

In a further aspect of the present invention there is provided a method for determining the location of the center of gravity of the vehicle, particularly an aircraft prior to take-off, comprising the steps of moving the vehicle along the roadway or the like over a plurality of load-measuring devices secured to the roadway whereby the individual load-supporting members of the vehicle contact the load-measuring devices for recording the loads applied respectively by the individual load-supporting members; and observing information computed by a computer linked to the devices for receiving data therefrom, the information comprising the center of gravity or information for readily determining the center of gravity.

In a further aspect of the present invention, there is provided a method for determining the location of the center of gravity of a vehicle, particularly an aircraft prior to its taking off, comprising the steps of moving the vehicle over load cell means such that the individual load-supporting members of the vehicle contact the load cell members and register the load applied by the individual load-supporting members; and subsequently operating the vehicle in a manner based upon the registered load data.

In a further aspect of the present invention, there is provided an apparatus for use in determining the weight and the location of the center of gravity of a vehicle, particularly an aircraft prior to its taking off, comprising in combination at least one load-measuring device secured to a roadway and adapted for contacting load-supporting members of the vehicle when such is moved thereover; computer means linked to the load-measuring devices and adapted to receive data therefrom; means for relaying to the operator of the vehicle data computed by the computer means, and sensor means linked to the computer means, the sensor means adapted to read characteristics of the vehicle as its observes the same and alert the computer, programmed for such characteristics.

In a further aspect of the present invention, there is provided a method of determining the amount of fuel consumed by an aircraft during its flight from one airport to another, comprising the steps of, moving the aircraft, readied for take-off, along a first pathway therefore and over first load-measuring means secured to the pathway, in such manner that the load-measuring means is contacted by the individual load-supporting undercarriage members of the aircraft, whereby to register the loads supported by the members, transmitting the registered load data to a computer means located remote from the first load-measuring means and the aircraft, whereby to ascertain the gross weight of the aircraft at take-off, moving the aircraft upon its landing at the further airport along a second pathway therefore and over second load-measuring means secured to the second pathway, in such manner that the second load-measuring means is contacted by the individual load-supporting undercarriage members of the aircraft, whereby to register the loads supported by the members and transmitting the load data registered by the second load-measuring means to the computer means, whereby to ascertain the gross weight of the aircraft at landing, computing with the computer means i.e. subtracting the computed gross weight of the aircraft immediately after landing from the computed gross weight of the aircraft prior to take-off, to determine the weight of fuel and thus amount of fuel consumed by the aircraft in travelling from the first load measuring means to said second load measuring means, accordingly between the one airport and the other.

In a further aspect of the present invention, there is provided a method of determining the weight of, and thus the amount of fuel, on board an aircraft prior to its taking-off for destination, comprising the steps of, weighing passengers, hand baggage, baggage and cargo prior to their being placed on board the aircraft, ascertaining the gross weight of the aircraft immediately prior to its taking off, subtracting from the ascertained gross weight, the "light" or unladen weight of the aircraft, the weight of the passengers, hand baggage, baggage and cargo, whereby to obtain the weight of and thus the amount of, the fuel on board the aircraft immediately prior to its taking off.

In a further aspect of the present invention, there is provided a method of determining the weight of, and thus the amount of, fuel on board an aircraft at given times, comprising the steps of, weighing passengers, hand baggage and baggage prior to their being placed on board the aircraft, coding the latter ascertained weights as to destination and/or assigned seating and entering such data into a first computer means located at the airport of departure, also into a second computer means, weighing cargo to be placed on board the aircraft and coding the cargo weight as to destination and entering the cargo coded weight into the first and second computer means, ascertaining the gross weight of the aircraft prior to its taking-off and transmitting the ascertained gross weight to the first and second computer means, thereafter subtracting from the ascertained gross weight, the sum of the measured weights of the passengers, hand baggage, baggage, cargo and the "light" unladen weight of the aircraft, whereby to obtain the weight and thus the amount of fuel on board the aircraft, ascertaining the gross weight of the aircraft just after its landing at a first destination airport and entering such landing weight data into the second and a third computer means located at the first destination airport, disembarking passengers, hand baggage, baggage and cargo at the first destination airport, subtracting the sum of the weight of disembarking passengers, hand baggage, baggage and cargo coded for the first destination airport from the ascertained gross weight of the aircraft just after landing, weighing new passengers, hand baggage and baggage prior to their being placed on board the aircraft, coding the latter ascertained weights as to destination and/or assigned seating and entering such data into the second and third computer means, weighing new cargo to be placed on board the aircraft and coding the cargo weight as to destination and entering the cargo coded weight into the second and third computer means and ascertaining the gross weight of the aircraft prior to its taking-off and transmitting the latter ascertained gross weight to the second and third computer means, thereafter subtracting from the latter ascertained gross weight, the sum of the measured weights of passengers, hand baggage, baggage and cargo and the "light" unladen weight of the aircraft, whereby to obtain the weight and thus the amount of, fuel on board the aircraft.

In a further aspect of the present invention, there is provided an apparatus for use in determining the static or dynamic weight of an aircraft while on the ground, the aircraft including main load-supporting members and secondary tail or nose load-supporting members, comprising in combination, a first load-measuring means secured in a ground support for the aircraft and adapted for contacting the main load-supporting members of the aircraft when such are moved there onto and a second load-measuring means secured in the ground support and in spaced relation to the first load-measuring means, the second load-measuring means adapted for contacting the further secondary load-supporting member of the aircraft when such is moved thereonto, whereby the first and second load-measuring means define a T-like configuration and are positioned one to another such that the main and secondary load-supporting members may both be supported on the apparatus at the same time.

In a further aspect of the present invention there is provided a method of determining the weight of, and thus the amount of fuel, on board an aircraft prior to its taking-off for a destination, comprising the steps of, positioning the aircraft at an airport gate therefor and while the aircraft remains stationary thereat, weighing the aircraft including passengers, hand baggage, baggage and any other items placed on board the aircraft prior to its taking-off, using load-measuring means present at the ground support for the aircraft at said gate, the load-measuring means comprising weight scale means supporting the respective wheels of the aircraft and providing weight data, ascertaining the gross weight of the aircraft and subtracting from the ascertained gross weight, the "light" or unladen weight of the aircraft, the weight of passengers, hand baggage, baggage and any other items placed on board the aircraft, whereby to obtain the weight and thus the amount of fuel on board the aircraft, prior to its taking-off.

In a further aspect of the present invention, there is provided a method of determining the weight of and thus the amount of fuel on board an aircraft prior to its taking-off for a destination, comprising the steps of, positioning the aircraft at an airport gate therefor and while the aircraft remains stationary thereat, removing all passengers, baggage and cargo therefrom whereby to render the aircraft in generally unloaded condition, also while performing such removal or thereafter, fuelling the aircraft, weighing the aircraft upon completion of fuelling using load measuring means present at the gate comprising weigh scale means supporting the respective wheels of the aircraft and deducting the generally unloaded condition weight of the aircraft from the weighed weight to provide the weight of fuel on board the aircraft.

In a further aspect of the present invention, there is provided a method of determining the gross weight of an aircraft prior to its taking-off for a destination, comprising the steps of, moving the aircraft towards an airport gate therefor and upon arrival thereat placing the respective wheels of the aircraft upon load measuring devices of a load measuring means whereby to park the aircraft wheels stationary on said load measuring devices and prior to or subsequent to the parking, programming the load measuring means for the aircraft type whereby the load measuring means operates to indicate the gross weight of the aircraft.

In a further aspect of the present invention, there is provided a method of determining the gross weight of an aircraft prior to its taking-off for a destination, comprising the steps of, moving the aircraft upon a ground support therefor towards load-measuring devices of a load-measuring means which is programmable for weighing different types of aircraft when positioned thereon and programming the load-measuring means whereby to weigh the aircraft.

In a further aspect of the present invention, there is provided a method for determining the location of the center of gravity of an aircraft prior to its taking-off, comprising the steps of, positioning the aircraft at an airport gate therefor and while the aircraft remains stationary thereat, weighing the aircraft, including passengers, hand baggage, baggage, and any other items placed on board the aircraft prior to its taking-off, using load-measuring means present at the ground support for the aircraft at the gate, the load-measuring means comprising weigh scale means supporting the respective wheels of the aircraft and providing weight data and utilizing the data derived from the load-measuring means to determine the center of gravity of the aircraft.

In a further aspect of the present invention, there is provided an apparatus for use in determining the static weight of an aircraft while parked at an airport gate, the aircraft including a cockpit and main load supporting members and secondary tail or nose load supporting members, prior to its taking off for a destination, comprising in combination, a first load-measuring means on or within the ground support for the aircraft at said gate, the measuring means adapted for contacting the main load-supporting members of the aircraft when such are moved thereonto, a second load-measuring means on or within the ground support for the aircraft at the gate and positioned in spaced relation to the first load-measuring means, the second measuring means adapted for contacting the further secondary load-supporting member of the aircraft when such is moved thereonto and while the main load-supporting members of the aircraft are in contact with the first load-measuring means, gross weight indicator means operably connected to the first and second load-measuring means and controller/interrogator means at the gate adapted to read a transponder means located on the aircraft, the controller/interrogator means for use in programming the first or second or both load-measuring means for said aircraft type whereby the first and second load-measuring means operate to indicate on the gross weight indicator means the gross weight of the aircraft.

In a further aspect of the present invention, there is provided a method of determining how much weight of cargo or the like can be placed on board a passenger type aircraft and where to place or distribute the cargo or the like within the aircraft whereby to ensure the center of gravity of the aircraft is located at its optimum position relative thereto comprising the steps of, determining the center of gravity of the aircraft including utilizing the respective weight of the passengers to be carried and their location within the aircraft, provided by their respective seat positions, determining the weight of cargo or the like which can be placed on board the aircraft, including utilizing the collective weight of the passengers, their baggage and possibly other items and selecting a loading location or locations within the aircraft based on data derived, and placing said cargo or the like at the load location or locations within the aircraft.

As will be evident from the present disclosure, the aforementioned computer may be located either onboard the aircraft or offboard the same; the load data may be transmitted from the load-measuring device via cables or other means, including radio; the center of gravity data or information for determining such may be relayed to the pilot of the aircraft by visual or audio means. Also, the sensor means linked to the computer may be mounted beside or in the roadway over which the aircraft passes. Further, the computer may be linked to the load-measuring devices by cable means or radio means and the sensor may be linked to the computer by cable means or radio means.

A further important aspect of the present invention is the provision of a load cell comprising many compartmentalized sections which operate independently one of another. As indicated, the presently disclosed apparatus may be used in connection with other vehicles such as wheeled vehicles where individual wheel loadings are required to be determined.

The present invention provides apparatus which may be integrated with existing airport equipment to provide additional services.

The present invention provides an integrated aircraft weighing system comprising a computer keyed to a unique registered number of individual aircraft and programmed with its characteristics, including landing gear configuration, weight and balance and other useful data which is alerted to that aircraft data when the aircraft passes a sensor suitably placed on the taxi ramp in the area of load-measuring cells linked thereto. The load-measuring cells are suitably disposed in or on the aircraft taxi ramp and register and transmit load data, in a predetermined manner, as the aircraft landing gear traverses the same. The computer is alerted to the configuration of the aircraft's landing gear and the disposition of the individual load cells over which they traverse and in turn, sorts and selects the registered loadings and provides the weight and balance data for that aircraft at that time and place.

The data is then available by visual or other means within the operator's areas and may be accessed and assessed as required from local and remote points for immediate and historical analysis. A visual readout is available at the taxi ramp as may be required.

Other aims and aspects of the present invention will become apparent from the reading of the description hereinafter.

BRIEF DESCRIPTION OF THE DRAWINGS

The invention is illustrated by way of example in the accompanying drawings wherein:

FIG. 1 is a diagramatic perspective view of an apparatus in accordance with the present invention, and showing an aircraft about to utilize the apparatus;

FIGS. 1A and 1B illustrate diagrammatically examples of load cell means used in preferred embodiments of the present invention;

FIG. 1C is a diagrammatic view of a further embodiment of load-measuring apparatus, in accordance with the present invention;

FIG. 2 is a diagrammatic perspective view similar to that of FIG. 1 but showing additional details;

FIGS. 3A and 3B represent a diagrammatic view showing a system in accordance with the present invention;

FIG. 6 is a diagrammatic side view of an aircraft including apparatus in accordance with the present invention;

FIG. 7 is a diagrammatic plan view of an airport gate in accordance with the present invention;

DESCRIPTION OF PREFERRED EMBODIMENTS

Figure 3B:
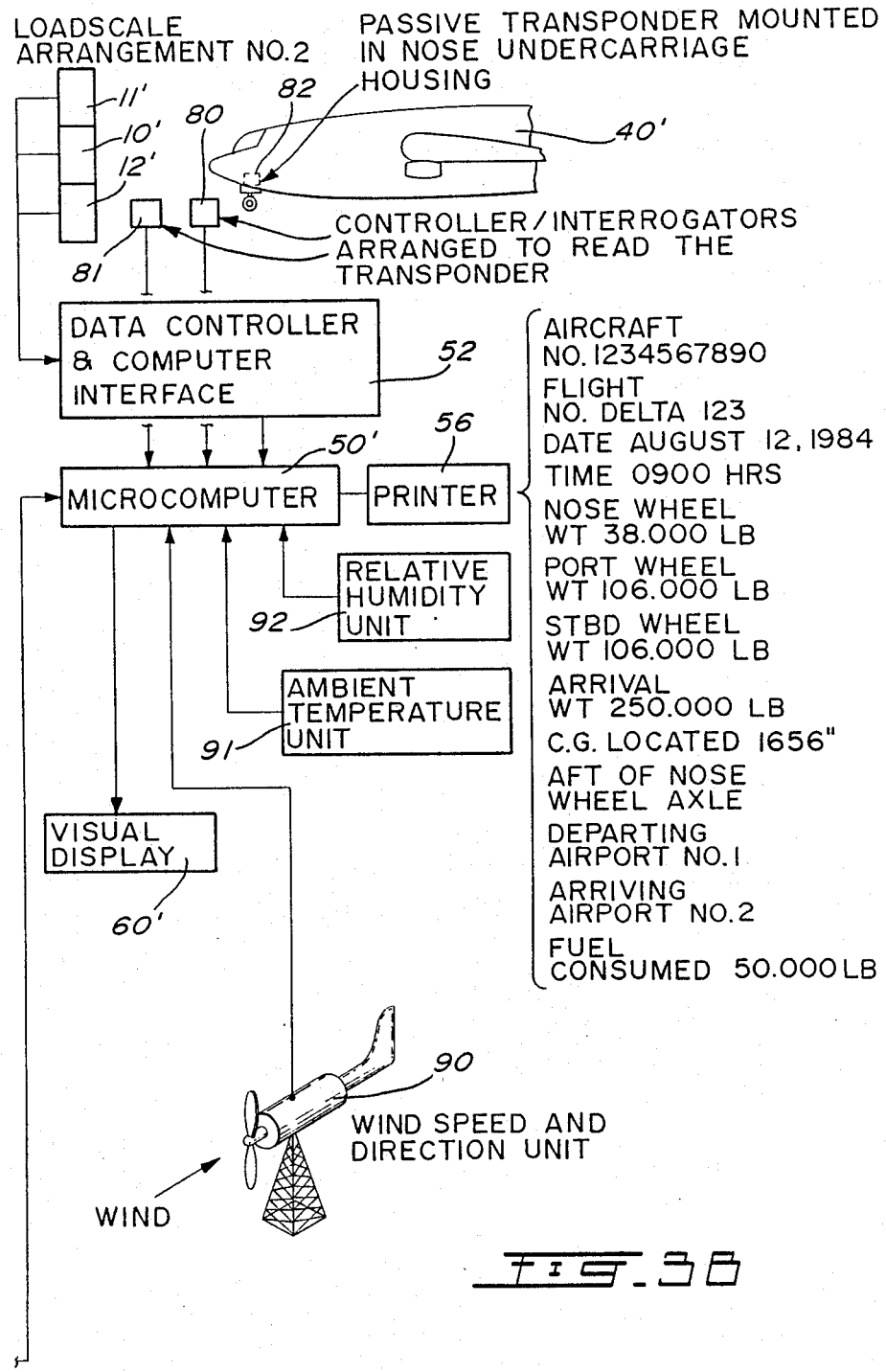

Referring to FIG. 1 illustrating basic aspects, there is shown an arrangement 100 comprising a plurality of load-measuring devices 10, 11 and 12, secured in a runway or roadway 20 and adapted, i.e., positioned such that they contact respectively the load-supporting members, i.e., individual undercarriage members 30, 31 and 32, of the aircraft 40 as such is moved thereover, either by driving or other means (not shown). Further shown is a computer means comprising a micro computer means 50, linked by cable means 51 to load-measuring devices 10, 11 and 12, and a data relaying means 60 for relaying (visually) to the pilot of aircraft 40, data computed by micro computer means 50. Also shown is a remote readout means 70 which may comprise a further data relaying means 60 and mounted in the operations management quarters of the airport. Upstream of load-measuring devices 10, 11 and 12, is a code sensor means 80 for use in alerting micro computer means 50 of characteristics of aircraft 40 as it passes the same upon being driven or otherwise moved along roadway 20 toward load-measuring devices 10, 11 and 12.

Load-measuring devices 10, 11 and 12, each comprise a load cell means of suitably commercially available type, for example, ones manufactured by Toledo Scale Ltd. Each of said load cell means comprises a weigh platform means supported upon at least one load-measuring cell, such is shown diagrammatically in FIG. 1a, wherein X denotes the weigh platform means mounted in roadway 20 and Y denotes a single load-measuring cell. FIG. 1b shows a further example of load cell means similar to that shown in FIG. 1a, utilizing two load-measuring cells. Thus, FIGS. 1a and 1b depict two examples of load-measuring devices in accordance with the present invention and others, as may be realized, may comprise many more load-measuring cells.

FIG. 1c illustrates a further embodiment in accordance with the present invention, being identical to that of FIG. 1, except wherein a single elongated load-measuring means 10″ is used in roadway 20. As seen, load-measuring means 10″ extends laterally of the roadway 20 so as to be contacted by all undercarriage members 30, 31 and 32 of aircraft 40. If desired, load-measuring means 10″ may be extended in size lengthwise of roadway 20 sized to accommodate all undercarriage members 30, 31 and 32, at a given time, such being useful for gross weight measurements. The extension of load-measuring means 10" is denoted by the laterally extending dotted line in roadway 20. Thus, FIG. 1c embodiment in the first instance, provides an arrangement whereby the longitudinal center of gravity of aircraft 40 may be determined.

Load-measuring devices 10, 11 and 12 are mounted in roadway 20 so as to be flush or substantially flush with the surface thereof. As seen, devices 11 and 12 are mounted in side-by-side relation whereby they may be contacted respectively by individual undercarriage members 31 and 32. As further seen, device 10 is mounted upstream of devices 11 and 12, whereby it may be contacted by individual undercarriage member 30. As may be realized, as an alternative, device 10 may be mounted downstream of devices 11 and 12. Thus, it is seen devices 10, 11 and 12 are strategically located within roadway 20 whereby they may be contacted by the individual undercarriage members 30, 31 and 32, for use in recording the load applied to the roadway 20 by the aircraft's individual load-supporting members.

It is evident devices 10, 11 and 12 may be housed in a single bounded arrangement or perhaps a single cell body having compartmentalized sections representing devices 10, 11 and 12. To illustrate this, chain dotted lines are shown extending across roadway 20 to define a rectangle, bounding devices 10, 11, and 12. Alternative designs of load-measuring devices may include a great number of compartmentalized devices for use in contacting various undercarriage configurations of aircraft ranging from small light planes to the heaviest of military aircraft.

Roadway 20 represents a conventional taxiway or runway as may be found at any airport.

Undercarriage members 30, 31 and 32 comprise a well-known tricycle configuration and it is evident that member 30 alternatively might comprise a tail wheel, which likewise moves generally along the center of the runway and would contact device 10.

Micro computer means 50 is of well-known type and may comprise, for example, ones manufactured by International Business Machines Ltd. Although micro computer means 50 is interconnected to load-measuring devices 10, 11 and 12, via cable means 51a, the latter may be replaced by other suitable means including radio transmitting and receiving means (not shown) capable of conveying signals from the load-measuring means.

Data relaying means 60 comprises a scoreboard type readout of suitable commercially available type, including ones manufactured by Toledo Scale Ltd. Data relaying means 60 may be interconnected to micro computer means 50 via cable means 51 or alternatively by other means including radio transmitting and receiving means (not shown) as mentioned above.

Remote readout means 70 interconnected to micro computer 50 by conventional cable means, is of well-known type such as that manufactured by Toledo Scale Ltd. The latter displays data displayed on readout scoreboard 60 for use of operations management of the airport. In the event micro computer means 50 is located onboard aircraft 40, data therefrom would be transmitted to readout means 70 by radio or other suitable means deemed well-known to those to which the present invention is directed.

Code sensor means 80 is of any suitable commercially available type including ones of the optical type and ones manufactured by Glenayre Electronics Ltd., Vancouver, British Columbia, such being interconnected by cable means or other suitable means, to micro computer means 50. As seen in FIG. 1, code sensor means 80 is positioned upstream of load-measuring means 10, 11 and 12, so as to "read" the type of aircraft as it passes thereby in movement toward devices 10, 11 and 12.

Referring to operation of arrangement 100, aircraft 40 passes along roadway 20 in the direction of the arrow shown, and as it passes by sensor means 80, the latter "reads" the aircraft and in effect alerts micro computer means 50 of the type of aircraft (for which it is keyed) approaching load-measuring devices 10, 11 and 12. As the aircraft rolls over devices 10, 11 and 12, the load data is transmitted therefrom to micro computer means 50 which then computes data based on its keying and thereafter transmits the data to scoreboard readout 60 and remote readout means 70. The displayed data may merely comprise the load applied by the individual undercarriage members of the aircraft for use by the pilot in compiling the center of gravity of the aircraft and gross weight thereof or it may alternatively comprise the center of gravity information together with the gross weight. Given this latter information, the pilot is enabled to plan further operation of the aircraft to ensure a safe and efficient take-off of the same.

As may be realized, a landing aircraft may utilize arrangement 100 thereby providing useful data to the operations management of the airport enabling it to monitor the magnitude of loads carried by the aircraft and disposition thereof with respect to the same.

The present invention contemplates other embodiments whereby said computer means, said means for relaying said computed data and said sensor means, are located in aircraft 40, either as part of same or applied as auxiliary equipment.

Reference is now made to the embodiment shown in FIG. 2, being similar to that shown in FIG. 1 but including further refinement.

Referring to FIG. 2, there is shown an arrangement 200 comprising a plurality of load-measuring devices 10', 11' and 12', each comprise a load cell means, the devices being secured in a roadway or runway 20' and adapted, i.e., positioned such that they contact respectively the load-supporting members, i.e., individual undercarriage members 30', 31' and 32' of the aircraft 40' as such is moved thereover.

Load-measuring devices 10', 11' and 12' are linked by a cable means 51' to a micro computer means 50' via a data controller and a computer interface means 52. A data relaying means 60' for relaying (visually) to the pilot of aircraft 40' is also linked by a cable means 53 to micro computer means 50'. Also provided is a remote readout means (not shown) which may comprise a further data relaying means 60', part of a main frame computer means 70'.

Upstream of load-measuring devices 10', 11' and 12' is an arrangement of controller/interrogators 80 and 81, mounted within roadway 20' and linked respectively by cable means 54 and 55 to micro computer means 50'. Controller/interrogators 80 and 81 are arranged such that as aircraft 40' travels along roadway 20', controller/interrogator 80 reads the unique identifying number programmed into the passive transponder 82 located in the nose wheel undercarriage 30' housing. As the aircraft 40' continues to travel along the roadway 20', the controller/interrogator 81 also reads the unique identifying number programmed into the passive transponder 82 whence the micro computer 50' is alerted to the unique registered number of aircraft 40' and to the speed at which the aircraft is approaching the load-measuring devices 10', 11' and 12'. Also seen is a wind speed and direction unit 90, ambient air temperature unit 91 and relative humidity unit 92, all being of suitable commercially available type and all linked as input devices to micro computer means 50', via cable means 93. As further seen, micro computer means 50' comprises a printer 56 connected via a cable means 56a.

A set of predetermined corrective factors are thereby applied to data transmitted through load-measuring devices 10', 11' and 12' to compensate for (1) transient inaccuracies introduced because of aircraft passing at variable speed over load-measuring devices of finite length; and (2) inaccuracies introduced because of wind strength and direction, ambient air temperature and relative humidity.

As further seen, micro computer means 50' is shown linked by cable means 56b to main frame computer means 70. The latter, it is anticipated, would be mounted in the corporate headquarters of an airline and linked by cable means to a micro computer means 50' located in the airline operations management area, in each of the airports in which that airline is active. This concept, whereby the fuel consumed by an aircraft in the process of flying from one airport to another airport, is shown diagrammatically in FIG. 3 and referred to hereinafter.

Load-measuring devices 10', 11' and 12' each comprise a load cell arrangement of suitable commercially available type, for example, ones manufactured by Toledo Scale Limited, under the trade name TRUCK-MASTER and having the weighbridge platform suitably arranged and disposed to accommodate the range of anticipated aircraft undercarriage and wheel arrangements. Installation of devices 10', 11' and 12' would thus be similar to those discussed above in respect of embodiment 100.

Micro computer means 50' is of well-known type and may comprise, for example, ones manufactured by International Business Machines Limited under the trade name IBM PC XT. Although the micro computer means 50' is shown interconnected to all other devices by cable means, it will be understood, the latter may be replaced by other suitable means including radio transmitting receiving means (not shown) capable of communicating signals to and from the micro computer means.

Data controller and computer interface means 52 is of suitable commercially available type, for example, one manufactured by Toledo Scale Limited under the trade name TSM 3000 DATA CONTROLLER.

Printer means 56 comprises a daisy wheel or dot matrix printer of suitable, commercially available type, including one manufactured by Epson Limited under the trade name RX-80.

Data relaying means 60' comprises a scoreboard type readout of suitable commercially available type, including ones manufactured by Toledo Scale Limited.

Main frame computer means 70' comprises a computer of suitable, commercially available type, including ones manufactured by International Business Machines Limited under the trade name IBM 3083.

As may be realized, operation of arrangement 200 is similar to that of arrangement 100.

Reference is now made to FIGS. 3A and 3B showing a block diagram representation of a system, thus a method based on the use of the apparatus shown in FIG. 2. Thus FIGS. 3A and 3B show a system allowing access by an airline to weight and location of center of gravity of an aircraft when such is (a) departing from a first airport; (designated No. 1); and (b) arriving at a second airport (designated No. 2).

Referring to FIGS. 3A and 3B, there is shown an arrangement comprising devices located at an airport No. 1, an airport No. 2, and at the airline common facilities, such as the head office thereof. For the purposes of this embodiment only, devices located at and description of operation of those devices, located at airport No. 1, are assumed to be identical to those located at airport No. 2.

Referring to airport No. 1, aircraft 40' with passive transponder 82, is moved over load-measuring devices 10', 11' and 12' prior to take-off. The weight data derived is transmitted to computer means 50' and corrected for inaccuracies, cited previously. Micro computer means 50' computes the gross weight of aircraft 40' by combining the individual weights measured by load-measuring devices 10', 11' and 12'. Micro computer means 50' also computes the center of gravity of aircraft 40' by taking moments about a fixed point on aircraft 40' caused by the loads measured by load-measuring devices 10', 11' and 12' and equates this to the moment caused by the computed gross weight of the aircraft acting at the location of the center of gravity.

Referring to airport No. 2, aircraft 40' is moved over load-measuring devices 10', 11' and 12' immediately after landing. The weight data derived is transmitted to the micro computer means 50' and corrected for inaccuracies cited previously. As in airport No. 1, the new gross weight and center of gravity are computed by micro computer means 50'. Micro computer means 50' then also computes fuel consumed in getting from airport No. 1 to airport No. 2, by subtracting the computed gross weight of aircraft 40' immediately after landing at airport No. 2 from the computed gross weight of aircraft 40' just prior to take-off from airport No. 1.

Figure 4A:
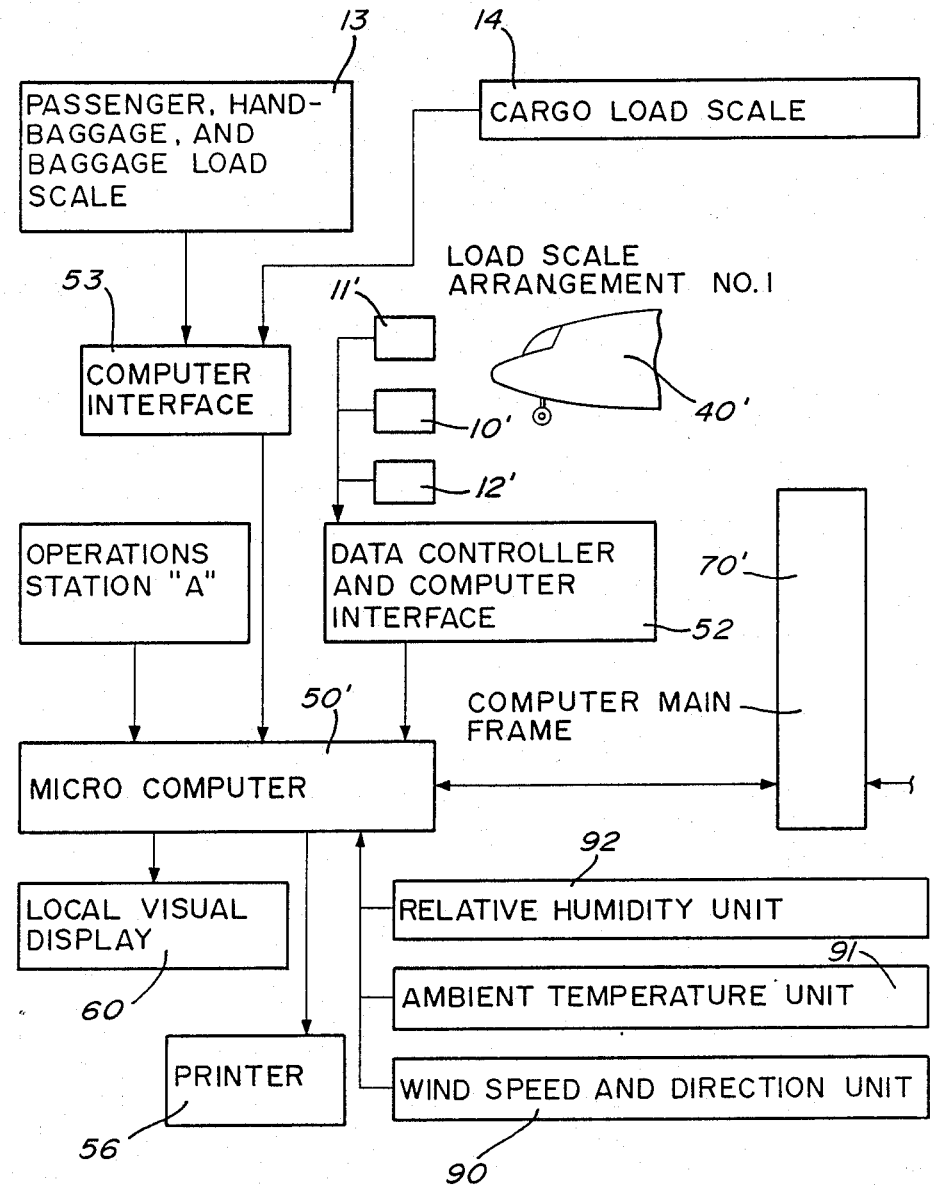
FIGS. 4A and 4B represent a diagrammatic view showing a further system in accordance with the present invention.
Figure 4B:
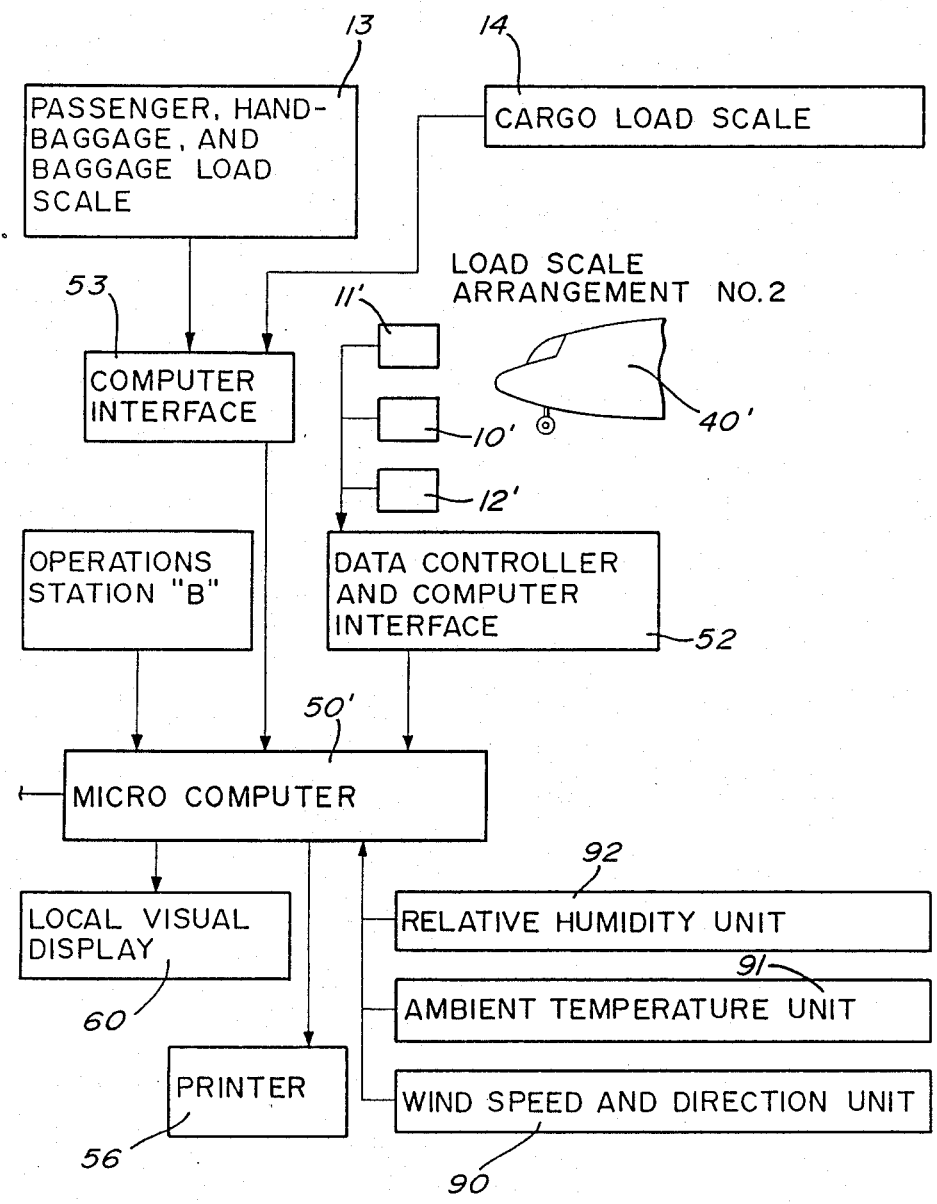

Reference is now made to FIGS. 4A and 4B, showing a further block diagram representation of a further system and accordingly further method in accordance with the present invention for use in determining weight of available fuel in an aircraft, prior to its taking off, again based on use of apparatus in accordance with the present invention, shown for example in FIGS. 3A and 3B.

With reference to FIG. 4A and airport No. 1 passengers, hand baggage and baggage are weighed in at the airline check-in counter by means of a weigh scale means 13, such as Howe-Richardson Model 5400 XL and which same is connected to a digital weight indicator complete with a computer output means 53 such as Howe-Richardson Model UMC 2000. The latter weights are coded as to destination and/or assigned seating and coded as to particular airport and aircraft at the operations station "A" and entered into micro computer means 50'.

Cargo is weighed in the cargo area by means of a weigh scale means 14 such as Howe-Richardson Model 5402 XL and which same is connected to a weight indicator complete with computer output signal means 53 such as Howe-Richardson Model UMC 2000. These weights are coded as to destination, received by the operations station and entered into micro computer means 50'.

The aircraft 40' is moved over load-measuring device means 10', 11' and 12' and the weight data is transmitted to computer means 50' which computes the gross weight of aircraft 40' as aforedescribed. The sum of the measured weights of passengers, hand-baggage, baggage, cargo and the "light" weight of aircraft 40' is subtracted from the measured gross weight of aircraft 40' just prior to take-off, in order to obtain the weight of available fuel.

With reference to FIG. 4B, and airport No. 2, the measured gross weight of aircraft 40' just after landing, is entered into micro computer means 50' as the aircraft 40' is moved over load-measuring device means 10', 11' and 12'.

Passengers, hand baggage, baggage and cargo with destination airport No. 2, leave the aircraft 40'.

Micro computer means 50' then subtracts the sum of the weights of passengers, hand baggage, baggage and cargo coded for destination airport No. 2 from the measured gross weight of aircraft 40', just after landing at airport No. 2.

In the same manner as in airport No. 1, new passengers, hand baggage, baggage and cargo are weighed, coded and entered into micro computer means 50'.

The measured gross weight of aircraft 40' prior to take-off from airport No. 2 is computed by micro computer means 50' as the aircraft is moved over load-measuring device means 10', 11' and 12' as aforedescribed. The new sum of weights of new passengers, hand baggage, baggage, cargo and "light" weight of aircraft 40', is subtracted from the measured gross aircraft weight prior to take-off from airport No. 2, in order to obtain the weight of available fuel prior to take-off from airport No. 2.

It is anticipated historical data may be utilized in place of measured passenger weights and baggage in computing the weight of available fuel.

From the foregoing and that discussed hereinafter, it will be apparent that the present invention contemplates the concept of planning loads in terms of magnitude and disposition within an aircraft in order to achieve optimum position of center of gravity thereof. Using for example, the aforementioned main frame or other data bank, airlines personnel are able to preplan loading of aircraft in a highly efficient manner to ensure reliable operation thereof. The concept is facilitated by knowing the weight of each passenger and his location (seat number) within the aircraft relative to a datum point therein. The concept of planning would apply to other load components, such as fuel.

From the foregoing disclosure, it will be seen that there is provided both method and apparatus for use in compiling not only the weight of aircraft but the weight of individuals and their baggage, prior to such entering an aircraft.

Accordingly, the present invention provides means for measuring, recording and storing data on individuals entering an aircraft for use in ensuring safe operation of the aircraft.

With the growing trend in terrorist activity, including hijacking of aircraft and the placing of explosives onboard the same, it is becoming exceedingly important to carry out further checks of individual passengers entering an aircraft, to ensure safe operation thereof.

The present invention provides a ready, convenient and effective way to accomplish this.

Having reference to the foregoing, including FIGS. 4A and 4B, since provision is made to ascertain the personal characteristic of weight, a number of further checks of personal data may be simultaneously compiled.

Figure 5:
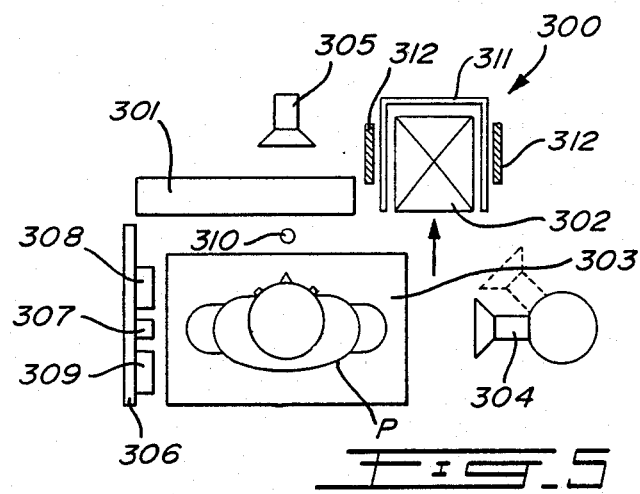
FIG. 5 is a plan view of a passenger check-in counter arrangement in accordance with the present invention.

To further explain, attention is directed to FIG. 5 showing a plan view of a passenger check-in installation at an airport, according to the present invention.

In FIG. 5, showing the check-in installation denoted 300, a conventional check-in counter 301 is provided having therebeside a conventional baggage weigh scale 302. A passenger P is shown before counter 301 and standing upon a further conventional weigh scale 303, which like scale 302, may be of the digital type, located in the floor in front of the counter 301. First and second wide-angle video cameras respectively denoted 304 and 305 are arranged whereby to photograph and record respectively side and front views of passenger P. Camera 304 includes a rotary mounting permitting it to pan on to scale 302.

A wall 306 having a scale 307 thereon is provided so that video camera 304 may photograph and record the height of passenger P. Wall 306 further includes, for photographing and recording by video camera 304, digital time and date instruments 308 and 309. It will be evident that instruments 308 and 309 may be combined into a single unit.

Installation 300 further includes a microphone 310 for use in recording data given by passenger P while standing at counter 301 and an explosive-drug detector 311. Thus detector 311 is of the well known "sniffer" type used for detecting the presence of explosives or drugs. In the embodiment disclosed, detector 311 comprises a horse-shoe shape affording baggage to be slid onto scale 302. In alternative embodiments, detector 311 may comprise a rectangular or circular ring configuration in which the baggage is inserted. A conventional type X-Ray arch 312 is provided for X-Raying the baggage placed upon scale 302. Video cameras 304 and 305 are of conventional well known type.

In other embodiments according to the present invention, installation 300 comprises alternative equipment, including of known nuclear magnetic type for use in identifying selected substances such as comprising drugs and explosives. Such devices operate using a foot-print profile comparison application.

It will be understood that the apparatus comprising installation 300 and installation 400 discussed hereinafter, may be arranged to operate on an individual basis independent on the other apparatus comprising the installations.

It is visualized that the checked-in baggage could be subjected to further checks subsequent to its leaving the check-in counter and prior to its being placed aboard the aircraft. Such may comprise apparatus capable of subjecting the baggage to a particular motion and/or a particular type of field of environment such as ones comprising high energy charges and high magnetic energy. Such would be carried out in reinforced structures so that personnel would be protected from any exploding baggage.

Attention is directed to FIG. 6 showing the further installation 400 comprising similar apparatus to that of installation 300 and alternatives discussed. Installation 400, which may comprise aircraft 40', i.e. form part thereof, or alternatively comprise auxiliary apparatus which is moved up to aircraft 40' as shown.

Referring to FIG. 6, it includes a passenger entrance door 401 and a cargo entrance door 402. Doors 401 and 402 include respective detector archway frames or circuitry 311' and 311", being similar apparatus to that of detector 311. A conventional X-Ray device 312' and 312", being similar to X-Ray device 312, is provided respectively adjacent doors 401 and 402 for use in X-raying baggage and clothing of passenger(s) P only. The use of the latter X-Raying equipment is manually or automatically controlled by suitable well-known instrumentation, such as light cells, ensuring passenger(s) P is not subjected to the dangers of radiation from the equipment. Not shown are well-known metal "frisk" type detector devices for use by airline personnel at the aircraft door 401 for checking passenger(s) P upon entry into aircraft 40'.

Adjacent or mounted on doorway 401' of door 401 of aircraft 40' is a video camera 304', being similar to video camera 304, for use in photographing and recording passenger P when entering aircraft 40'. Camera 304' further, at the same time, records date and time entry data picked up from instruments 308' and 309' mounted adjacent or on doorway 401' and being similar to respective aforementioned instruments 308 and 309. A microphone 310' is also included adjacent doorway 401' for recording the passenger's voice in announcing personal data upon entering aircraft 40'.

The various apparatus comprising installations 300 and 400 and alternative ones discussed, are operatively connected using conventional well-known means, to the computer main frame 70' 1 shown in FIGS. 3A and 4A. This provides the airport and the airline authorities with a detailed personal record of respective passengers and their baggage entering respective aircraft, including any detected substances such as drugs and explosives, permitting appropriate action to be taken or planned by the authorities. It will be understood main frame 70' is adapted to record the audio and video information applied to it by the installations discussed along with the unique number identity of the aircraft and type, fed indirectly to main frame 70' by a sensor means similar to items 80 and 81 located for example at the airport gate, discussed hereinafter.

Detailed description of the known apparatus comprising installations 300 and 400 have been dispensed with since those skilled in the art to which the present invention is directed are deemed well familiar with such apparatus and its installation and operation.

Referring to the operation of installations 300 and 400, passenger P steps up to check-in counter 301 and in doing so steps on floor mounted scale 303. Switches associated with scale 303 (not shown) are activated to power all the apparatus comprising installation 300. Also not shown, is an over-ride switch means permitting independent manual operation of installation 300 and the independent operation of the apparatus comprising installation 300.

Thus, as passenger P stands on scale 303 his weight is recorded and he is photographed by video cameras 304 and 305 to record his front and side profiles, including his height. Time and date of his presence at the check-in counter 301 is recorded by video camera 304. He presents appropriate documentation, including passport papers which are held so as to be photographed by video camera 305 and provides personal data by speaking, which is recorded by microphone 310. Such data includes his name and address, contact person in case of emergency, reason for trip, etc. This operation records the voice of passenger P including his accent, etc. He places all his baggage piece by piece or otherwise on scale 302 which, while on scale 302, is photographed by rotation of video camera 304 positioned theretoward. Alternatively, a further video camera (not shown) may be provided for this purpose. The baggage, while on scale 302, is subjected to X-Ray by arch 312 for detection of arms and unusual-shaped objects and is sniffed for explosives and drugs, etc., by "sniffer" 311 and also weighed by scale 302. Again, magnetic nuclear devices, as discussed above, may also be used at this location along with metal detectors.

Passenger P then departs from check-in counter 301 and proceeds to board aircraft 40'. Passenger P's baggage, subsequent to being checked in at counter 301, enters aircraft 40' through a cargo doorway, one of which is indicated by way of example in FIG. 6, i.e. when door 402 is opened. As the baggage is put aboard the aircraft 40' it thus passes further "sniffer" detector 311" and further X-Ray arch 312" and possibly magnetic nuclear devices and metal detectors. Thus a check is made to ensure nothing was included in the baggage subsequent to its being checked in at check-in counter 301.

Passenger P enters aircraft 40' through a doorway one of which is indicated by way of example in FIG. 6, i.e. when door 401 is opened. As he enters aircraft 40', he is frisked by airline personnel with the aforementioned portable frisking device and his readily removable clothing such as jacket, and any hand baggage, is subjected to X-Ray by X-Ray device 312' and his body and clothing and hand baggage is sniffed by "sniffer" detector 311'. Also, possibly other devices to detect if explosives and/or drugs are present. The time and date of his entry into aircraft 40' is recorded by video camera 304', operation of which together with the other apparatus of installation 400, may also be controlled automatically or otherwise by suitable well-known means. Passenger P also announces prior to his entry into the aircraft the personal data or part thereof given previously at check-in counter 301, which is recorded by microphone 310'. The data given would include his identifying himself and confirmation of his seating position in the aircraft.

The apparatus comprising installation 400 may of course be utilized for use in the control of persons besides passenger(s) P, being ones employed to enter and service aircraft 40'. It may also include a passenger weigh scale at the aircraft entrance which compiles the total weight of passengers loaded on the aircraft at a given time.

The apparatus comprising installations 300 and 400, since it may be individually controlled, thus permits parts of the apparatus comprising installations 300 and 400 to be used for partial checks of passengers and their baggage where such is warranted or desired. It will be evident that the various steps of examination and recording discussed above might be performed elsewhere besides the airline check-in counter, although this is deemed a convenient place in which to carry out such examinations.

Having further reference to the checking-in of passenger's baggage, it is common practice for labels and tags to be attached to baggage and hand baggage of passengers at the conventional check-in counter or at other locations, however, such labeling can become lost or changed accidentally or otherwise. In order to overcome this problem, the aforementioned photographing of baggage is carried out. An alternative to this or if desired to compliment this, the passenger's fingerprints may be applied to his baggage for ready identification.

Various methods for recording ones fingerprints on various materials are known, as also are ones for identifying fingerprints on various materials. Such identifying methods include "plasticizing" the prints which permits clearer results to be obtained over the well-known "dusting" process. To facilitate the recording of the fingerprints on the baggage, a non-removable (without damaging the same) tag comprising a sensitized face to receive the fingerprint (having a peel protection thereover) could be applied to the baggage, such tag could also include the passenger's seat number.

Figure 1D:
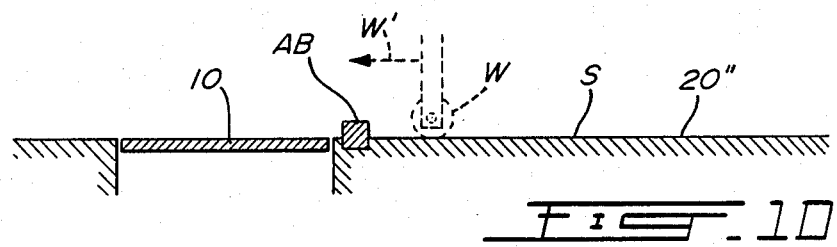
FIGS. 1D and 1E are diagrammatic side views of further embodiments of load-measuring apparatus in accordance with the present invention.
Figure 1E:
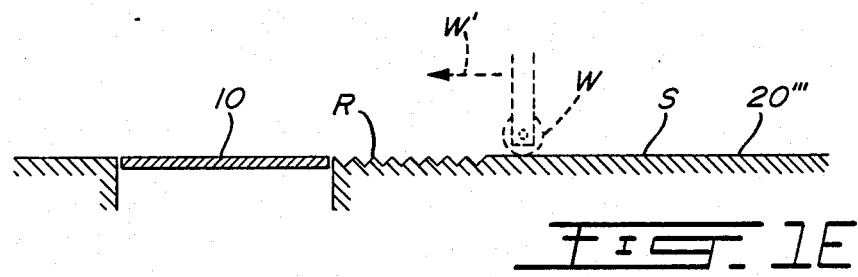
Figure 1F:
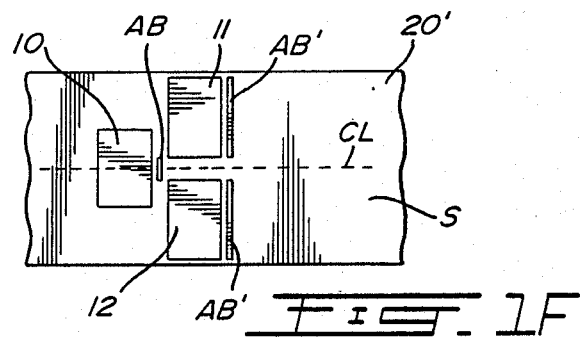
FIG. 1F is a plan view of that shown in FIG. 1D including additional load-measuring apparatus of the embodiment.

Further embodiments of the aircraft weighing apparatus according to the present invention are shown diagrammatically in FIGS. 1D, 1E and 1F, the latter being a plan view showing part of that shown in FIG. 1D. FIGS. 1D and 1E represent a sectional view taken longitudinally through respective runways or roadways and showing an aforedescribed load-measuring device installed therein.

Referring first to the embodiment shown in FIG. 1F and partly seen also in FIG. 1D, there is seen a runway or roadway 20" and load-measuring devices 10, 11 and 12 installed therein, such being similar to the arrangement shown in FIG. 1. In this embodiment, the runway or roadway includes an abutment adjacent the respective load-measuring devices. Such comprise abutment AB adjacent load-measuring device 10 and respective abutments AB' adjacent load-measuring devices 11 and 12. Runway or roadway 20" includes a substantially smooth level outer surface S preceding abutments AB and AB' in the direction of travel W' of aircraft wheel W.

Abutments AB and AB' comprise a ridge on the surface of runway or roadway 20" and further comprise, in the case of the embodiment shown, a hard long-wearing steel bar. Alternatively, abutments AB and AB' may comprise reinforced runway or roadway materials or other suitable materials. Abutment AB it will be seen from FIG. 1F, extends laterally of runway or roadway 20" so as to be engageable by wheel W comprising an aircraft nose or tail wheel tracking along the runway or roadway centerline CL in the direction of arrow W'. Abutments AB' it will be further seen from FIG. 1F extend laterally of runway or roadway 20" the full width of load-measuring devices 11 and 12, the purpose being to accommodate, as aforediscussed, various strut spacings of aircraft undercarriage arrangements, thus to ensure the further wheels of the aircraft contact abutments AB'.

During operation of this further embodiment of aircraft weighing apparatus, the wheels of the aircraft, for example aircraft 40, when they are rolling toward load-measuring devices 10, 11 and 12 on surface S, strike abutments AB and AB', causing oscillation of the mountings of the respective aircraft wheels as they advance to engage the respective load-measuring devices. These oscillations of the respective wheel mountings assist in the operation of the load-measuring devices 10, 11 and 12 when comprising certain types of design, i.e. ones which provide a load reading based on the averaging out oscillations of the load applied thereto.

FIG. 1E it will be seen is identical to that of FIG. 1D except for showing a series of ridges R preceding the load-measuring device 10 when seen in the direction of arrow W'. Thus this embodiment offers an alternative to the use of abutments AB and AB', namely, a series of ridges R which cause the mounting of the aircraft wheels, and accordingly the aircraft wheels, to oscillate as they engage respective load-measuring devices 10, 11 and 12.

From the foregoing disclosure, it will be seen embodiments of the aircraft weighing apparatus according to the present invention comprise load-measuring means for use in determining the static weight of an aircraft while on the ground, the aircraft including main load-supporting members and secondary tail or nose load-supporting members, and the load-measuring means comprising a T-like configuration. FIGS. 1 and 2 disclose such T-like configuration resulting from the arrangement of load-measuring devices 10, 11 and 12 and 10', 11' and 12' respectively.

In the case of embodiments according to the present invention intended purely for static weighing of aircraft and accordingly not in-motion weighing of aircraft, the wheel contact area size of the load-measuring devices, for example devices 10, 11 and 12, may be of much reduced dimension to those shown in FIGS. 1 and 2. This is particularly true in the case of the aircraft weighing apparatus being located at an airport gate and where such gate is used exclusively by one model of aircraft, or any number of aircraft having similar footprints. The three load-measuring devices in such instance would appear in a pattern and of proportion similar to that shown in FIG. 1C in respect of the rectangles 30, 31 and 32 representing undercarriage members i.e. the three load-measuring devices being spaced whereby to be under each of the wheels of the parked aircraft and of size necessary to accommodate each wheel or sets of wheels. The same pattern would apply to a nose or tail wheeled aircraft. The wheel contact area could of course be enlarged to accommodate a number of aircraft using such gate. With present scale technology, it is possible to use modular load-measuring devices which plug into or otherwise integrate one another or the mounting therefor, whereby to selectively increase or decrease the aircraft wheel contact area of each load-measuring device such as items 10, 11 and 12 shown. Furthermore, such can be readily installed on the surface of the aircraft roadway or aircraft gate parking area. This allows the weighing equipment configuration at the airport gate to be readily changed to suit differing models of aircraft.

In the case where the load-measuring devices are located at an airport gate, passengers, baggage, and possibly other items including cargo, and the amount of fuel would be weighed collectively. The data derived from the load-measuring devices would be computed to provide the load placed on the aircraft and the disposition thereof relative thereto, accordingly providing the center of gravity of the aircraft. Thus the static weighing procedure could be performed under ideal environmental conditions, which could even be enhanced by enclosing or part enclosing the gate area around the aircraft, should such be considered advisable or necessary. Such might be considered where gate areas are located in open high wind swept regions.

It will be understood that the airport gate static weighing installation may comprise various other applicable instrumentation as aforedescribed in respect of other discussed embodiments of the invention, including controller/interrogators 80 and 81 which would be mounted within or on the ground support for the aircraft at the gate or other suitable location. Such would of course be used in similar manner as aforedescribed in respect of FIG. 2 embodiment i.e. for programming the equipment for servicing the particular model of aircraft at the gate also for identifying the unique number of the aircraft. Operation of the various instrumentation at the gate would thus be similar to that aforedescribed in respect of the other embodiments disclosed.

Attention is directed to FIG. 7 showing a typical airport gate installation 500 in accordance with the present invention, such comprising load-measuring devices 10a, 11a and 12a. In this particular embodiment, devices 10a, 11a and 12a are of relatively thin cross-sectional dimension and are supported upon the roadway surface 13a of the airport gate. Such design of device permits ready removal and replacement of the same, avoiding disturbance of surface 13a and allows the load-measuring apparatus to be quickly tailored to suit a change in type of aircraft using the airport gate. Alternatively in more permanent gate installations, of course the gate installation may comprise apparatus similar to that shown for example in FIG. 2.

The dotted lines surrounding devices 10a, 11a and 12a seen in FIG. 7, illustrate but one example of increased size of wheel contact surface applied to the devices in order to accommodate the foot prints (wheels) of several types of aircraft using the gate. Note the T-like configuration shown in FIG. 7.

The aforementioned thin cross-sectional dimension results from the sandwich type construction of the load-measuring devices. By sandwich is meant first and second planar members comprising plate material intermediate which are provided a plurality of load cells. The latter load cells may be of suitable commercially available type, arranged in honeycombed configuration of said first and second planar members and be detachably secured in position therebetween, such affording ready servicing of the devices. The load cells in such instance may comprise pill-like shape.

Devices 10a, 11a and 12a which are connected by conventional means such as cables or radio signal to gross weight indicator GWI arranged whereby to be directly in front of the pilot of the aircraft while parked at the gate. A centre gravity indicator CGI is also provided and similarly arranged for ready reference of the pilot, and which functions in similar manner, as aforedescribed, respective of the other embodiments disclosed. Controller/interrogators CI comprises items 80 and 81 as aforedescribed, which reads the unique identifying number of the aircraft and programs, the weighing apparatus comprising devices 10a, 11a and 12a. Although an optional feature, installation 500 includes a further information indicator M1 providing wind speed, temperature, humidity and other information deemed useful to the pilot in the operation of his aircraft.

Installation 500 may include in addition to load-measuring devices 10a, 11a and 12a, a further load measuring device 14a for measuring an aircraft tail wheel load (i.e. when the aircraft is driven into the gate in the same direction as that of aircraft having a tricycle undercarriage. Thus installation 500 provides for both tricycle undercarriaged and other known undercarriaged type aircraft where the instrumentation read outs GWI and CGI appear in front of the pilots' position. Although perhaps less convenient, the tail wheel of an aircraft could be accommodated on device 10a, taking into account most aircraft using a given gate will comprise tricycle undercarriage arrangements. Of course such arrangement would require an elongated version of device 10a.

Regarding operation of installation 500, an aircraft with tricycle undercarriaged (not shown) to be weighed, is driven toward devices 10a, 11a and 12a, its nose wheel proceeding in direction TR along centre line CL until the wheels of the aircraft are positively situated respectively upon devices 10a, 11a and 12a. However, before the wheels of the aircraft reach devices 10a, 11a and 12a, the controller/interrogator CI reads the unique identifying number of the aircraft and transmits it to main frame 70' and at the same time programs the scales, that is the load-measuring means, to suite the type of aircraft to be weighed, thus operating in similar fashion to that described in respect of, for example, FIG. 2 embodiment. It is to be remembered that the aforementioned scale programming feature permits a number of different types of aircraft to use one load-measuring installation.

With the aircraft wheels in place upon devices 10a, 11a and 12a, the aircraft brakes may be applied to ensure no further movement thereof occurs relative to the load-measuring devices. With the aircraft in this braked position and with its engines stopped, weighing procedures are subsequently proceeded with.

Various procedures may be followed using installation 500 to ensure an aircraft is fully fuelled prior to its departure therefrom.

Bearing in mind that it is quite common in present day airport operations for an aircraft to enter and remain at an airport gate for about an hour and be fuelled within 20 minutes upon arrival at the gate, one procedure for determining a full complement of fuel is on board an aircraft using installation 500 under such circumstances, may comprise the following:

upon arrival at the gate and with the aircraft parked on devices 10a, 11a and 12a, all passengers and their baggage and any cargo are removed. Also upon arrival of the aircraft at the gate, as is customary, fuelling of the same is commenced. Upon completion of the fuelling, the aircraft is then weighed. The unladen weight of the aircraft is then deducted from the weighed figure to provide weight of fuel on board and thus the amount of fuel on board the aircraft. It is evident that the equipment calculating and recording the amount of fuel may be programmed with the unladen i.e. generally unloaded condition weight of the aircraft whereby no human error is involved in calculating the weight of the fuel and also what volume this represents, the programming being triggered by the sensors programming the weighing equipment for the type of aircraft resting on devices 10a, 11a and 12a. As an alternative to said triggering by sensors, manual operation may be employed, however, this has the drawback in that it allows the element of human error to be introduced. The gate weighing equipment provides the weight data in either metric or imperial measurement, depending upon the aircraft. The gate weighing equipment may also provide data in both metric and imperial measurement.

Upon completion of determining the amount of fuel on board the aircraft, the passengers, baggage and cargo are loaded thereon and it is then reweighed using devices 10a, 11a and 12a to obtain the gross weight and centre of gravity using aforedescribed procedures. Thus the gross weight and centre of gravity data are provide before the aircraft leaves the gate for take-off.

It will be evident from the present disclosure taken as a whole, various other procedures may be used in determining the weight of fuel on board the aircraft and thus the amount of fuel on board the same, prior to its departure for take-off.

It is also evident from the foregoing a similar installation to installation 500 may be provided and operated in similar manner at a cargo aircraft loading installation.

From the foregoing it will be seen the airport gate static weighing installation, provides a relatively inexpensive apparatus for carrying out the check of the total load on board the aircraft, the center of gravity of the aircraft, and if certain procedures are followed in weighing that put on the aircraft, the amount of fuel on board the aircraft, prior to its departure for take-off. Such installation can be readily controlled and serviced by the gate personnel or ones responsible for loading fuel, passenger's baggage, etc. on board the aircraft.

From the foregoing it will be seen the term "platform" refers to wheel receiving an supporting planar structures, such as those shown in FIGS. 1 and 2. The term may also refer to wheel receiving and supporting areas such as those shown in FIGS. 7 and 13, including defined by dotted lines. These areas may comprise one or many wheel load weighing means, the number and positioning of the load weighing means within the areas being dictated by their size and by the different "footprints"/"wheel prints" of the aircraft to be weighed. In some instances the aforementioned weighing means are secured in place by a grid-like structure comprising a frame. Alternatively, they could be set directly into the roadway, their peripheral spaced edges one to another defining a grid-like configuration also. In still other cases, the weighing means may be supported directly or indirectly upon a planar structure per se, including a concrete slab and secured by suitable means including a grid-like frame. FIGS. 8-13 disclose further examples of arrangements comprising "platforms" secured in spaced relation one to another. FIGS. 7, 8, 10, 11, 12 and 13 for example comprise a three-platform arrangement defining a T-like configuration whereas FIG. 9 comprises a single platform arrangement. In some instances the "platforms" may comprise a rectangular outline shape. In other instances they may comprise an irregular outline shape, as for example seen in FIG. 10.

Referring now in detail to FIGS. 8 through 13.

Figure 8:
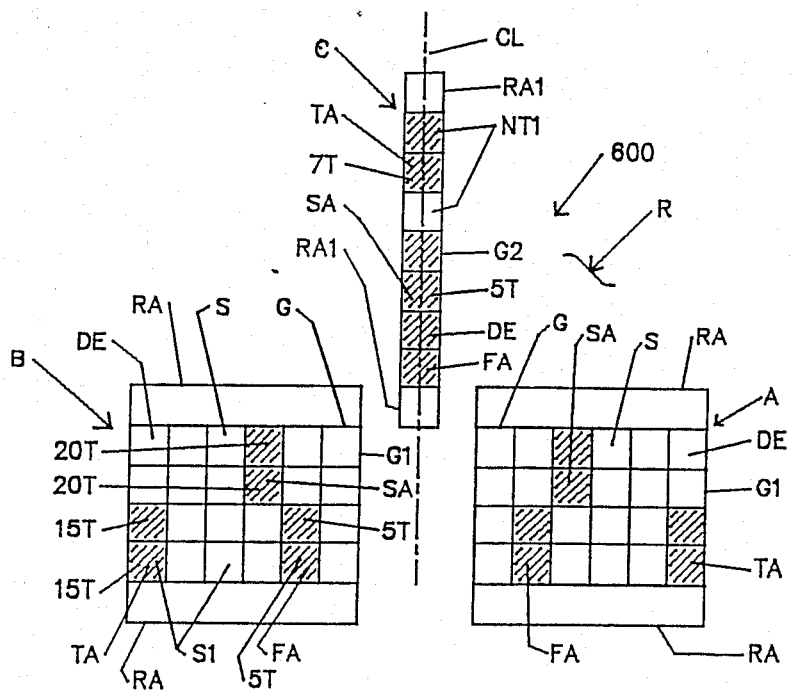
FIGS. 8–13 inclusive are diagrammatic plan views of further aircraft weighing apparatuses in accordance with the present invention.

FIG. 8 discloses an aircraft weigh scale arrangement 600 comprising a plurality of load measuring devices, namely three platforms A, B and C secured to a roadway R in fixed spaced relation one to another. Platforms A, B and C together comprise a T-shaped configuration, as indicated above with respect to FIGS. 1 and 2. Platforms A and B disposed symetrically about the longitudinal centreline CL along which the aircraft nose or tail wheel passes are similar in surface area and comprise a wheel-supporting surface S which itself comprises a grid-like configuration defining a plurality of load measuring means DE. In this particular embodiment of the invention the surface S comprises 24 load-measuring means DE each having a rectangular shaped wheel supporting surface S1. Other embodiments not shown may comprise devices corresponding to load-measuring means DE having non-rectangular wheel supporting surfaces. Load-measuring means DE are secured in place via a grid or grid-like configuration G comprising a grating G1 set into or on roadway R in well known manner. In this particular embodiment, grid G/grating G1 sits slightly proud of the wheel supporting surface of roadway R, access to and from surfaces S1 being via slight incline ramps RA. Ramps RA provide a controlled damping of the aircraft wheels, particularly in the case of dynamic weighing. Ramps RA and RA1 discussed hereinafter are shown in FIG. 8 as an example, being an option for applicable ones of the embodiments shown. Alternatively, load-measuring means DE may be set directly into roadway R in spaced relation one to another, such providing a grid-like configuration. Roadway R may comprise any suitable material including concrete.

Figure 11:
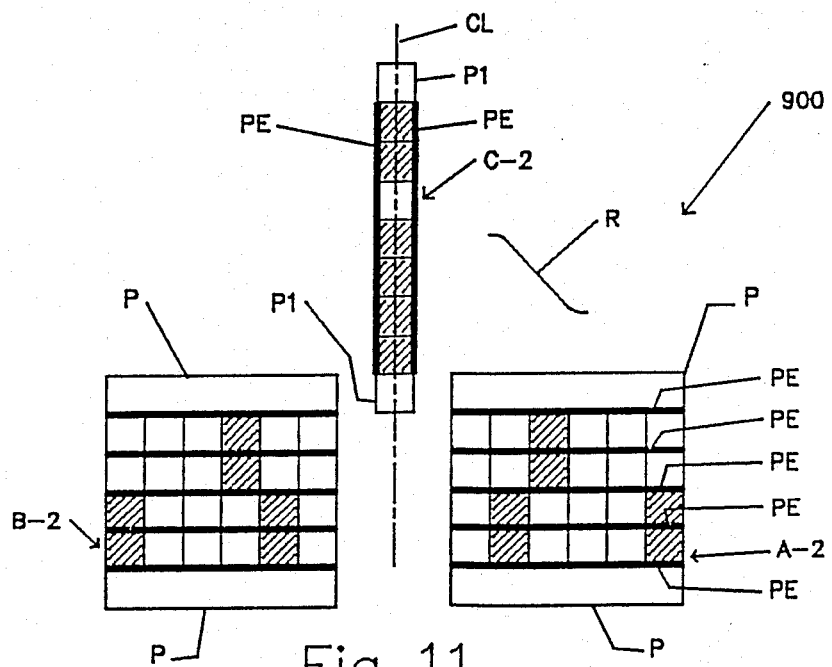

As a further option, applicable to other embodiments, i.e. ones where grid G/grating G1 mounts load-measuring means DE wheel supporting surface substantially flush with that of the roadway R, non-ramp Plates P, for convenience illustrated in FIG. 11, may be installed in or on roadway R to provide or assist in providing a controlled behaviour of the approaching aircraft wheel(s) to be weighed. Plates P, like ramps RA, may comprise various wheel supporting surfaces including smooth or rippled/abutment types. The wheel supporting surface of plates P are generally aligned with those of load measuring means DE.

Load-measuring means DE comprise low profile flat wheel load weighing means of the type manufactured by PAT Prozess-Automatisierungs-Technik GmbH and Co. KG. In this particular embodiment representing one example of embodiment load-measuring means DE have load-measuring capacities. In other embodiments they may vary in size as for example shown in FIG. 10.

In platforms A and B each area in the grid contains a low profile flat wheel load weighing means. The load-measuring capacities of some have been indicated namely 15T, 20T and 5T representing 15 tons, 20 tons and 5 tons respectively.

Having reference to FIG. 8 for example, one can see the load-measuring capacity of at least a portion of Platforms A and B increases in the lengthwise direction of roadway R. Further, that the load-measuring capacity of at least a portion of platforms A and B increases in the lateral direction of roadway R, though not progressively. Other embodiments (not shown) may of course comprise platforms or portions thereof having load-measuring capacities which increase progressively laterally of roadway R, such resulting from the tailoring of the platform load-measuring capacities to meet specific aircraft weighing needs. Likewise in other embodiments (not shown), the platforms or portions thereof may comprise load-measuring capacities which increase non-progressively in the lengthwise direction of roadway R.

As will be understood, Platforms A and B receive and support the main undercarriage wheels of various different aircraft having respectively different lateral wheel spacings or bogey wheel spacing, as aforediscussed.

Platform C for receiving and supporting aircraft nose or tail wheels (including bogey wheels) of various different aircraft having respectively different nose to main gear (main undercarriage) wheel spacings, comprises a wheel supporting surface NT1 with a ladder type grid-like configuration G2 defining a plurality of load-measuring means DE. In this particular embodiment of the invention, the surface NT1 comprises seven load-measuring means DE each as mentioned above, having a rectangular shaped wheel supporting surface. Load-measuring means DE are secured in place via grid G2 comprising a grating set into roadway R as in the case of grating G1. Platform C likewise includes slight incline ramps RA1 being similar to ramps RA and being provided for similar purpose. Alternatively, load-measuring means DE may be set directly into roadway R utilizing suitable means, as discussed above with respect to Platforms A and B. Load-measuring means DE in grid G2 likewise comprise low profile flat wheel load weighing means of the type mentioned above. Again load-measuring means DE in grid G2 have varying load-measuring capacities. The four extending adjacent platforms A and B have a 5 ton capacity and the remaining three have a seven ton capacity. Like those in respect of platforms A and B, they have load-measuring capacities suitable for weighing the particular aircraft for which arrangement 600 has been designed. The shaded areas in the various figures represent the "footprints" of the main undercarriage wheels of three different aircraft weighed by arrangement 600. Arrangement 600 is capable of weighing the aircraft when parked or in motion. Arrangement 600 is designed to weigh many different types of aircraft but, for reasons of clarity, only three will be discussed.

In the case of static weighing of an aircraft, the wheel contact surface needed is smaller than in the case of dynamic weighing. This is because, depending on speed of motion of the aircraft and the sensitiveness of the scale, there must be sufficient interaction between the aircraft wheel and the scale whereby to accurately record the weight applied by the aircraft wheel. A single load-measuring means in some instances would be sufficient for static weighing.

In FIG. 8, an elongation of the weighing means in the direction of travel is shown, i.e. extending over at least two load-measuring means DE of a given load-measuring capacity. In some instances more or only one means DE may be sufficient to record the dynamic weight of the aircraft.

Thus it will be understood that FIG. 8 and for that matter FIGS. 9-13 inclusive, show merely examples of grid-like configurations comprising the present invention.

In the present example of embodiment for static weighing of the aircraft, each of which comprises three wheels, each wheel would occupy a single load-measuring means DE. Other aircraft comprising bogey wheels might occupy additional load-measuring means DE. Having further reference to FIG. 8 and regarding the static weighing, the wheels of the first of the three aircraft selected would occupy load-measuring means DE further labelled FA. The second of the three aircraft would occupy load-measuring means DE further labelled SA. The third of the three aircraft would occupy load-measuring means DE further labelled TA.

Thus the unshaded areas in FIG. 8 denote load-measuring means DE to be occupied by further aircraft, which may utilize arrangement 600. Alternatively, if such other aircraft would not utilize arrangement 600, the unshaded load-measuring means DE may be replaced by dummy plates, i.e. non-load weighing means. The load-measuring capacities of the unshaded areas comprising load-measuring means DE have been omitted for purposes of clarity. It will thus be evident grids G1 and G2 may comprise various configurations the extent of which are governed by the "footprints" of the aircraft and type of weighing to be undertaken.

Platforms A, B and C of arrangement 600 are interconnected by electric circuitry similar to that of aforedescribed embodiments, and which may also include a computer means for totalling the loads registered by the three platforms. Included in the circuitry is a load readout means common to all embodiments.

To weigh aircraft using arrangement 600, the aircraft are rolled upon roadway R lengthwise thereof toward platforms A, B and C. If the aircraft is to be dynamically weighed, it is merely driven whereby the nose or tail wheel follow centre line CL, allowing the respective aircraft wheels to roll over platforms A, B and C at a selected speed whereby to accurately register the loads carried by the respective wheels of the aircraft on the aircraft weight readout means.

If the aircraft is to be statistically weighed, it is merely driven whereby to place and park the wheels on the respective load-measuring means DE, the "footprints" in FIG. 8 giving examples of which load-measuring means DE might be utilized, depending on the aircraft to be weighed.

Figure 9:
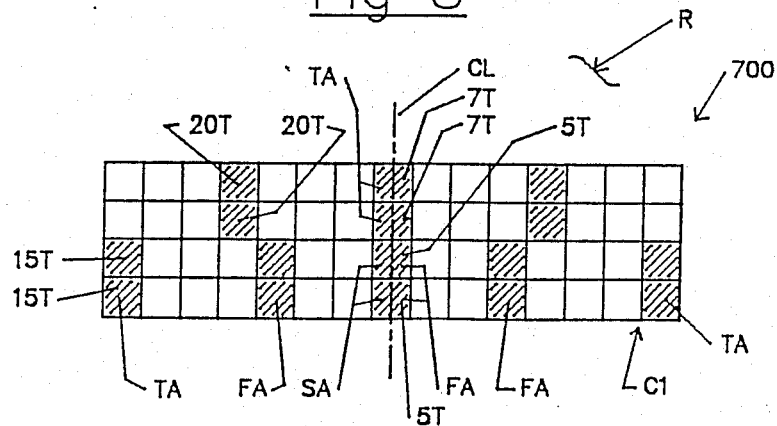

Attention is now directed to FIG. 9 showing an arrangement 700, having a platform C1 such representing a compaction of arrangement 600. The main undercarriage wheel "footprints" of the three aircraft shown in FIG. 8 are seen super-imposed on load-measuring means DE of arrangement 700.

FIG. 9 shows one example of a dynamic or weigh-in-motion scale, and a static or park-and-weigh scale, in accordance with the present invention. Thus arrangement 700 is somewhat similar to that shown in FIG. 1C.

As similarly explained with respect to FIG. 8, for static weighing, the wheels of the first of the three aircraft would occupy load-measuring means DE further labelled FA, the wheels of the second of the three aircraft would occupy load-measuring means DE further labelled SA and the wheels of the third of the three aircraft would occupy load-measuring means DE further labelled TA. For Dynamic weighing two load-measuring means DE are provided as similarly provided in the FIG. 8 embodiment. The dynamic weighing operation for the FIG. 9 embodiment is similar to that of FIG. 8 embodiment. The static weighing operation is different in that the aircraft need to be moved twice, once to park the nose or tail wheel(s) for registering its load and once to park the main undercarriage wheels for registering their load.

Figure 10:
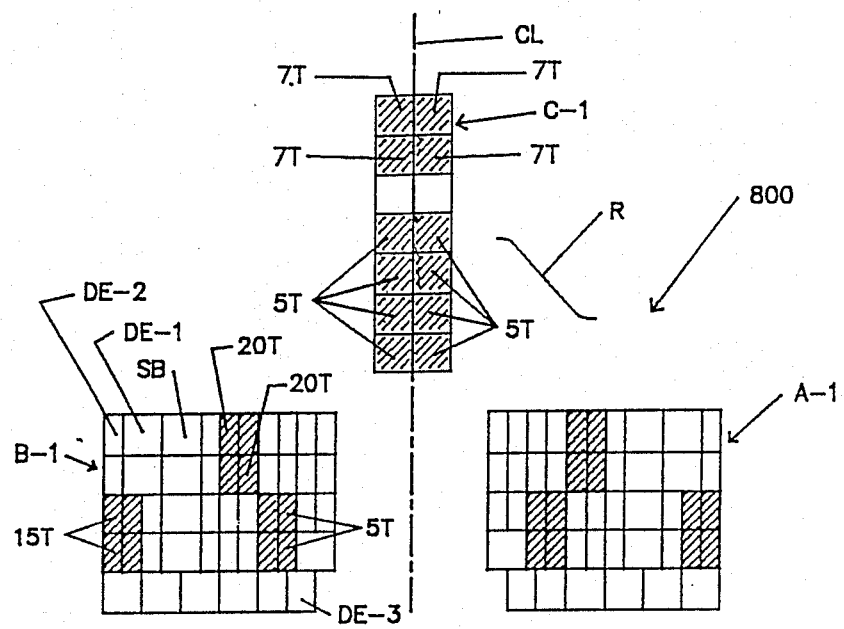

Attention is now directed to FIG. 10 showing a further preferred embodiment according to the invention, namely arrangement 800 comprising a plurality of load-measuring devices A-1, B-1 and C-1 secured to roadway R in fixed spaced relation one to another.

Platforms A-1 and B-1 it will be seen are also symetrically disposed about the longitudinal centreline CL. Platform B-1 being a mirror image of platform A-1, platform B-1 will be described. Platform B-1 comprises a wheel supporting surface SB which itself comprises a grid-like configuration defining a plurality of load-measuring means DE-1, DE-2 and DE-3.

In this particular embodiment, the surface SB it will be seen is not totally rectangular in shape and that the load measuring means vary not only in size one to another but are not completely aligned one to another in terms of their peripheral edges, clearly seen in the case of the load-measuring means specifically labelled DE-3. All of this stems from a tailoring of load-measuring means whereby to be able to precisely engage specific main undercarriage wheels of ones of a variety of different aircraft having many varying main undercarriage wheel spacings, and various bogey wheel arrangements, notwithstanding the low profile flat wheel load weighing means can still register accurately wheel loads cantilevered to some extend therefrom.

Load-measuring means DE-1, DE-2 and DE-3 of which platform B-1 comprises a plurality of each, are secured in place in similar manner as aforedescribed. The basic difference between this FIG. 10 embodiment and the FIG. 8 embodiment is the difference in the size and shape of the platforms and differing grid-like configuration defining different low profile flat wheel load weighing means.

FIG. 10 like FIGS. 8 and 9 shows the same respective "footprints" of the thus same three aircraft. Platforms A-1 and B-1 have similar spacing therebetween as platforms A and B notwithstanding platform C-1 is wider than platform C in order to accommodate bogey nose wheels. As will be evident, the load-measuring capacities of the shaded load-measuring means are similar to those shown shaded in FIG. 8.

Attention is now directed to FIG. 11 showing a further embodiment of the invention, namely arrangement 900. This embodiment is identical to that shown in FIG. 8 except that the low profile flat wheel load weighing means include peripheral edges PE which are non-weighing areas. As seen edges PE are arranged whereby to extend laterally of roadway R in the case of platforms A-2 and B-2 and longitudinally of roadway R in the case of platform C-2. The purpose of this arrangement is to provide uninterrupted live weighing surface laterally of the roadway whereby to maximize "live" weighing exposure for the many varying wheel positions defined by the multitude of lateral main undercarriage wheel spacings of the different aircraft. As will be realized nose or tail "footprints" are basically common with the differing aircraft, their wheel loads of course varying substantially one to another.

Figure 12:
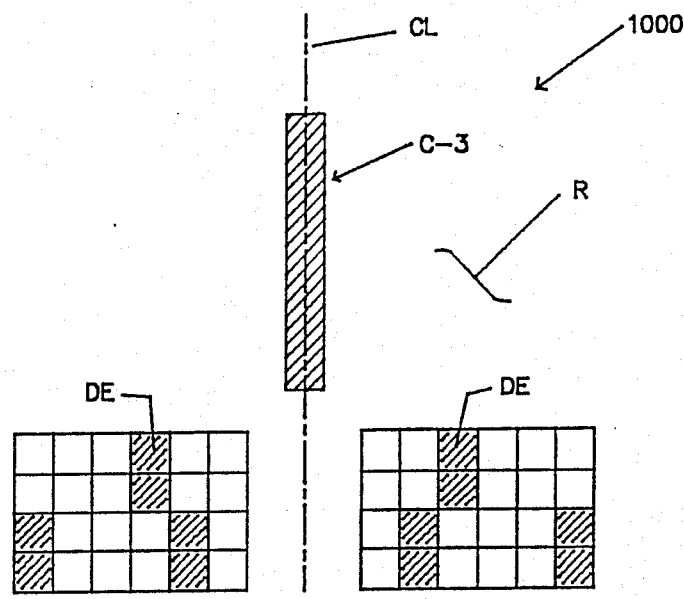

Attention is now directed to FIG. 12 showing a further embodiment of the invention namely arrangement 1000. This embodiment is identical to that shown in FIG. 8 except that the nose or tail wheel platform C-3 comprises a wheel weighing means of the type shown and described with respect to FIGS. 1 or 2. This combination of different types of platforms for certain weighing applications is deemed to result in a more economical arrangement.

Figure 13:
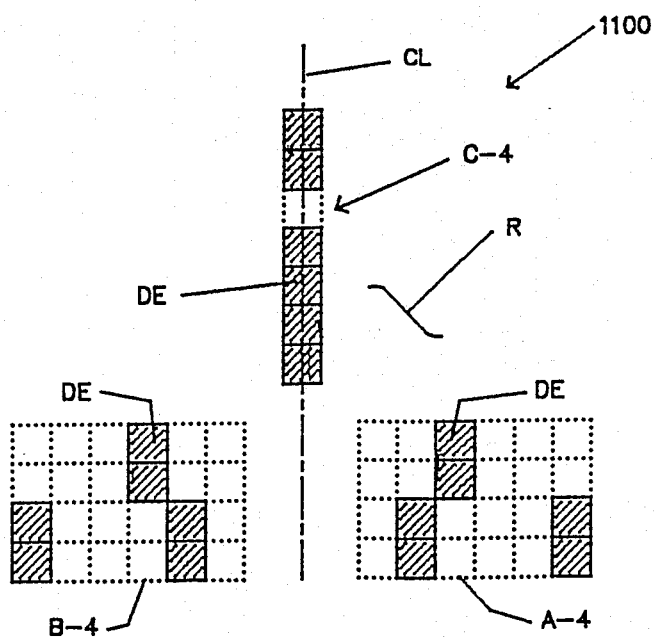

Finally, attention is directed to FIG. 13 showing a further embodiment, namely arrangement 1100, it too being identical to that shown in FIG. 8 except the low profile flat wheel load weighing means are placed directly in the roadway R. As in the case of FIGS. 8 through 12, the "footprints" of the three examples of aircraft are shown. Platforms A-4, B-4 and C-4 are defined by dotted line and as mentioned in regard to FIG. 8 define either further load-measuring means DE or blank non-measuring areas comprising either roadway material or dummy plates.

As will be realized the operation of the various embodiments are similar and as aforedescribed in regard to the embodiment shown in FIG. 8 for example.

The present invention is deemed to represent a major advance in the art of operating and controlling aircraft, particularly in providing safer operation thereof.

We claim:

1. An apparatus for use in determining the respective weight of different types of aircraft rapidly prior to their successively taking off, each aircraft including at least a pair of laterally spaced main undercarriage wheels and a tail or nose wheel longitudinally spaced from said main undercarriage wheels with the lateral spacing between the main undercarriage wheels as well as the longitudinal spacing between the nose or tail wheel and the main undercarriage wheels varying substantially from one type of aircraft to another, said apparatus comprising in combination:

(a) a plurality of load-measuring devices secured to a roadway in spaced relation one to another and integrally forming part of said roadway, said roadway including an aircraft wheel supporting surface, ones of said devices each comprising an elongated aircraft wheel supporting platform extending transversely of said roadway for receiving and supporting the respective varyingly spaced main undercarriage wheels of said different types of aircraft as said aircraft are moved along a common path of travel upon said roadway, said path extending in a direction generally normal to the length of each platform, said elongated aircraft wheel supporting platform extending transversely of said roadway having an aircraft wheel supporting surface comprising a grid-like configuration defining a plurality of load measuring means, a further one of said devices comprising an aircraft wheel supporting platform positioned in said path of travel for receiving and supporting the respective nose or tail wheel of said different types of aircraft as said aircraft are moved along said common path of travel; and (b) aircraft weight readout means linked to said load measuring devices for displaying load data measured thereby upon said platforms receiving and supporting thereon said respective aircraft nose or tail and main undercarriage wheels.

2. An apparatus as defined in claim 1, wherein one or more of said load measuring means vary in size one to another whereby their wheel supporting surfaces vary in size one to another.

3. An apparatus as defined in claim 1, wherein said load measuring means comprise a rectangular shaped wheel supporting surface.

4. An apparatus as defined in claim 1, wherein said load measuring means comprise a low profile flat wheel load weighing means.

5. An apparatus as defined in claim 1, wherein one or more of said load measuring means vary in load measuring capacity one to another.

6. An apparatus as defined in claim 1, wherein said elongated aircraft wheel supporting platform positioned in said path of travel for receiving and supporting the respective nose or tail wheel of said different types of aircraft has an aircraft wheel supporting surface comprising a grid-like configuration defining a plurality of load measuring means.

7. An apparatus as defined in claim 1, wherein said elongated aircraft wheel supporting platform positioned in said path of travel for receiving and supporting the respective nose or tail wheel of said different types of aircraft, has an aircraft wheel supporting surface comprising a plurality of load measuring means arranged in tandem alignment therealong.

8. An apparatus as defined in claim 6, wherein said load measuring means comprise a low profile flat wheel load weighing means.

9. An apparatus as defined in claim 7, wherein said load measuring means comprise a low profile flat wheel load weighing means.

10. An apparatus as defined in claim 6, wherein one or more of said load measuring means vary in load measuring capacity one to another.

11. An apparatus as defined in claim 7, wherein one or more of said load measuring means vary in load measuring capacity one to another.

12. An apparatus as defined in claim 4, wherein said low profile flat wheel load weighing means comprises non-weighing wheel supporting portions extending adjacent opposing side peripheral edges thereof and said portions extend in a direction transversely of said roadway.

13. An apparatus as defined in claim 8, wherein said low profile flat wheel load weighing means comprises non-weighing wheel supporting portions extending adjacent opposing side peripheral edges thereof and said portions extend in a direction lengthwise of said roadway.

14. An apparatus as defined in claim 1, wherein said grid-like configuration defines a plurality of linearly extending rows of load measuring means, the rows being consecutively positioned in tandem spaced arrangement one behind the other whereby the grid-like configuration extends lengthwise of said roadway, ones of said load measuring means varying in load measuring capacity one to another and arranged within said grid-like configuration such that the load measuring capacity of at least a portion of said platform increases in the lengthwise direction of said roadway.

15. An apparatus as defined in claim 1, wherein said grid-like configuration defines a plurality of linearly extending rows of load measuring means, the rows being consecutively positioned in tandem spaced arrangement one behind the other whereby the grid-like configuration extends lengthwise of said roadway, ones of said load measuring means varying in load measuring capacity one to another and arranged within said grid-like configuration such that the load measuring capacity of at least a portion of said platform increases in the lateral direction of said roadway.

16. An apparatus as defined in claim 1, wherein said wheel supporting surface comprising said grid-like configuration is elevated above said wheel supporting surface of said roadway, and ramp means is provided intermediate said wheel supporting surfaces whereby to facilitate controlled reception of the aircraft wheel to be weighed.

17. An apparatus as defined in claim 1, wherein said wheel supporting surface comprising said grid-like configuration is mounted whereby to be substantially in-line with said wheel supporting surface of said roadway, and a flat plate means is provided intermediate said wheel supporting surfaces whereby to facilitate controlled reception of the aircraft wheel to be weighed.

18. An apparatus for use in determining the respective weight of different types of aircraft rapidly prior to their successively taking off, each aircraft including at least a pair of laterally spaced main undercarriage wheels and a tail or nose wheel longitudinally spaced form said main undercarriage wheels with the lateral spacing between the main undercarriage wheels as well as the longitudinal spacing between the nose or tail wheel and the main undercarriage wheels varying substantially from one type of aircraft to another, said apparatus comprising in combination:
(a) a single load-measuring device secured to and integrally forming part of a roadway, said roadway including an aircraft wheel supporting surface, said device including an elongated aircraft wheel supporting platform extending transversely of said roadway for receiving and supporting the respective nose or tail wheel and varyingly spaced main undercarriage wheels of said different types of aircraft as said aircraft are moved along a common path of travel upon said roadway, said path extending in a direction generally normal to the length of said platform, said elongated aircraft wheel supporting platform having an aircraft wheel supporting surface comprising a grid-like configuration defining a plurality of load measuring means; and
(b) aircraft weight readout means linked to said load-measuring device for displaying load data measured thereby upon said platform receiving and supporting thereon said respective aircraft nose or tail and main undercarriage wheels.

19. An apparatus as defined in claim 18, wherein one or more of said load measuring means vary in size one to another whereby their wheel supporting surfaces vary in size one to another.

20. An apparatus as defined in claim 18, wherein said load measuring means comprise a rectangular shaped wheel supporting surface.

21. An apparatus as defined in claim 18, wherein said load measuring means comprise a low profile flat wheel load weighing means.

22. An apparatus as defined in claim 18, wherein one or more of said load measuring means vary in load measuring capacity one to another.

23. An apparatus as defined in claim 21, wherein said low profile flat wheel load weighing means comprises non-weighing wheel supporting portions extending adjacent opposing side peripheral edges thereof and said portions extend in a direction transversely of said roadway.

24. An apparatus as defined in claim 18, wherein said grid-like configuration defines a plurality of linearly extending rows of load measuring means, the rows being consecutively positioned in tandem spaced arrangement one behind the other whereby the grid-like configuration extends lengthwise of said roadway, ones of said load measuring means varying in load measuring capacity one to another and arranged within said grid-like configuration such that the load measuring capacity of at least a portion of said platform increases in the lengthwise direction of said roadway.

25. An apparatus as defined in claim 18, wherein said grid-like configuration defines a plurality of linearly extending rows of load measuring means, the rows being consecutively positioned in tandem spaced arrangement one behind the other whereby the grid-like configuration extends lengthwise of said roadway, ones of said load measuring means varying in load measuring capacity one to another and arranged within said grid-like configuration such that the load measuring capacity of at least a portion of said platform increases in the lateral direction of said roadway.

26. An apparatus as defined in claim 18, wherein said wheel supporting surface comprising said grid-like configuration is elevated above said wheel supporting surface of said roadway, and ramp means is provided intermediate said wheel supporting surfaces whereby to facilitate controlled reception of the aircraft wheel to be weighed.

27. An apparatus as defined in claim 18, wherein said wheel supporting surface comprising said grid-like configuration is mounted whereby to be substantially in-line with said wheel supporting surface of said roadway, and a flat plate means is provided intermediate said wheel supporting surfaces whereby to facilitate controlled reception of the aircraft wheel to be weighed.

28. A method for determining the weight of an aircraft prior to its taking off, said aircraft including a nose or tail wheel and at least a pair of laterally spaced main undercarriage wheels, said method comprising the steps of:
(a) moving the aircraft upon said wheels along a path of travel upon a roadway lengthwise thereof in preparation for take off which path of travel is common with other aircraft using said roadway for take off, said other aircraft having a nose or tail wheel whose spacing respective their main undercarriage wheels varies substantially as does the lateral spacing of the main undercarriage wheels one to another;
(b) maintaining said movement along said path of travel, including passing the wheels of the aircraft over a load-measuring device secured to and forming part of said aircraft roadway, said load-measuring device comprising a single elongated platform extending transversely of said roadway for contact by all the wheels of said aircraft, as well as those of said other aircraft, as said wheels are received and supported upon said platform for registering the loads carried thereby; said platform having an aircraft wheel supporting surface comprising a grid-like configuration defining a plurality of load measuring means, said wheels of the aircraft, during their passing over said load measuring device, engaging ones of said plurality of load measuring means as determined by the spacing of said aircraft wheels one to another; and
(c) registering said loads.

29. A method for determining the weight of an aircraft prior to its taking off, said aircraft including a nose or tail wheel and at least a pair of laterally spaced main undercarriage wheels, said method comprising the steps of:
(a) moving the aircraft upon said wheels along a path of travel upon a roadway lengthwise thereof in preparation for take off, which pat of travel is common with other aircraft using said roadway for take off, said other aircraft having a nose or tail wheel whose spacing respective their main undercarriage wheels varies substantially as does the lateral spacing of the main undercarriage wheels one to another;
(b) maintaining said movement along said path of travel including passing the wheels of the aircraft over a plurality of load-measuring devices secured in spaced relation one to another and forming part of said aircraft roadway, said load-measuring devices together being elongated to extend transversely of said roadway for contact by all the wheels of said aircraft as well as those of said other aircraft, as said wheels are received and supported upon said load-measuring devices for registering the loads carried thereby; at least said devices contacting the main undercarriage wheels of said aircraft comprising an aircraft wheel supporting platform having an aircraft wheel supporting surface comprising a grid-like configuration defining a plurality of load measuring means, said main undercarriage wheels of the aircraft during their passing over said load measuring devices, engaging ones of said plurality of load measuring means as determined by the spacing of said main undercarriage wheels one to another; and
(c) registering said loads.

30. A method for determining the weight of aircraft respectively one after another, while each in turn is parked prior to preparation for take off, said aircraft including a nose or tail wheel and at least a pair of laterally spaced main undercarriage wheels providing a three-point support for the aircraft and wherein the spacing between said nose or tail wheel and the main undercarriage wheels varies substantially from one aircraft to another and wherein the lateral spacing between said main undercarriage wheels varies substantially from one aircraft to another, said method comprising the steps of:
(a) moving a first one of said aircraft upon its wheels along a path of travel upon a roadway therefor, said path of travel being in common with that of other aircraft using said roadway;
(b) maintaining said movement of said first one of said aircraft along said path of travel, including placing and parking the respective wheels thereof upon respective load-measuring devices positioned in spaced relation one to another and forming part of said roadway for registering the respective loads carried by said respective wheels, said load-measuring devices each including an aircraft wheel supporting platform whose top surface area is sufficient to receive and support the respective wheels of said respective aircraft as they pass along said common path of travel; at least said top surface area receiving and supporting the main undercarriage wheels of said aircraft comprising a grid-like configuration defining a plurality of load measuring means, said main undercarriage wheels engaging ones of said plurality of load measuring means as determined by the spacing of said main undercarriage wheels one to another;
(c) registering said respective wheel loads as said aircraft wheels rest upon said platforms;
(d) moving said first one of said aircraft to remove the wheels thereof from said platforms;
(e) moving a second one of said aircraft upon its wheels along said path of travel upon said roadway;
(f) maintaining said movement of said second one of said aircraft along said path of travel and while maintaining said load-measuring devices in position in said spaced relation one to another, placing and parking the respective wheels of said second one of said aircraft upon said respective wheel supporting platforms for registering the respective wheel loads of said second one of said aircraft; said main undercarriage wheels of said second one of said aircraft engaging ones of said plurality of load measuring means as determined by the spacing of said main undercarriage wheels of said second aircraft one to another; and
(g) registering said respective wheel loads of said second one of said aircraft as the wheels thereof rest upon said platforms.

31. A method for determining the weight of aircraft respectively one after another, said aircraft each including a nose or tail wheel and at least a pair of laterally spaced main undercarriage wheels providing a three-point support for the aircraft and wherein the spacing between said nose or tail wheel and the main undercarriage wheels varies substantially from one aircraft to another, and wherein the lateral spacing between said main undercarriage wheels varies substantially from one aircraft to another, said method comprising the steps of:

(a) moving a first one of said aircraft upon its wheels along a path of travel upon a roadway therefor, said path of travel being in common with that of other aircraft using said roadway;

(b) maintaining said movement of said first one of said aircraft along said path of travel, including placing and parking the nose wheel, or in the case of an aircraft having a tail wheel, to place and park the main undercarriage wheels, on a single load-measuring device extending transversely of said roadway for registering the load carried by said nose wheel or main undercarriage wheels, said device comprising a platform having an aircraft wheel supporting surface, said surface comprising a grid-like configuration defining a plurality of load measuring means, said main undercarriage wheels of the aircraft during their being placed and parked on said device engaging ones of said load measuring means as determined by the spacing of said main undercarriage wheels one to another;

(c) registering said nose wheel load or main undercarriage wheel loads;

(d) moving said first one of said aircraft along said path of travel to remove said nose wheel or main undercarriage wheels from said load-measuring device;

(e) maintaining said movement of said first one of said aircraft along said path of travel to place and park the main undercarriage wheels, or in the case of an aircraft having a tail wheel, to place and park the tail wheel, on said single load-measuring device for registering the load carried by said main undercarriage wheels or tail wheel;

(f) registering said main undercarriage wheel loads or said tail wheel load;

(g) adding the load or loads registered in step (f) to that registered in step (c) whereby to determine the weight of the aircraft including moving said first one of said aircraft along said path of travel to remove said main undercarriage wheels or tail wheel from said load-measuring means; and (h) moving a second one of said aircraft upon its wheels along said path of travel and thereafter performing steps (b) through (g) with said second one of said aircraft.

32. A method for determining the weight of an aircraft prior to its taking off, said aircraft including a nose or tail wheel and at least a pair of laterally spaced main undercarriage wheels, said method comprising the steps of:

(a) moving the aircraft upon its wheels along a path of travel upon a roadway therefor toward a load-measuring device secured to and forming part of said roadway, said load measuring device comprising an aircraft wheel supporting platform having an aircraft wheel engaging surface, said surface comprising a grid-like configuration defining a plurality of load measuring means, said path of travel being common with that of other aircraft using said roadway and load-measuring device, for use in determining the weight thereof, said other aircraft having a nose or tail wheel whose spacing respective their main undercarriage wheels varies substantially as does the lateral spacing of the main undercarriage wheels, one to another;

(b) maintaining said movement along said path of travel, including placing and parking the respective wheels of the aircraft upon said platform for registering the loads carried by said respective wheels, said respective wheels while parked upon said platform engaging ones of said plurality of load measuring means, as determined by the spacing of said respective wheels, one to another;

(c) registering said respective wheel loads as said aircraft wheels rest upon said load-measuring means; and (d) removing said respective wheels of the aircraft from said load-measuring means whereby to permit said other aircraft to be moved along said path of travel for weighing, one at a time, while said load-measuring means remains in fixed position with said roadway.

33. A method for determining the weight of a vehicle, an aircraft prior to its taking off, said aircraft including a plurality of wheels including at least a pair of laterally spaced main undercarriage wheels, said method comprising the steps of:

(a) moving the aircraft along a path of travel toward a load-measuring device, which path of travel is common with that of other aircraft using said load-measuring device for use in determining the weight thereof, said other aircraft also having a plurality of wheels including at least a pair of laterally spaced main undercarriage wheels whose spacing varies substantially one aircraft to another, said device comprising an aircraft wheel supporting platform having an aircraft wheel engaging surface, said surface comprising a grid-like configuration defining a plurality of load measuring means;

(b) maintaining said movement along said path of travel, including placing and parking the respective wheels of the aircraft upon said platform for registering the loads carried by said respective wheels, said respective wheels while parked on said platform engaging ones of said plurality of load measuring means, as determined by the spacing of said respective wheels, one to another;

(c) registering said respective wheel loads as said aircraft wheels rest upon said load-measuring means; and (d) removing said respective wheels of the aircraft from said load-measuring means whereby to permit said other aircraft to be moved along said path of travel for weighing, one at a time, while said load-measuring means remains fixed in position with said roadway.

* * * * *